(12) United States Patent
Bringsjord et al.

(10) Patent No.: US 7,333,967 B1
(45) Date of Patent: Feb. 19, 2008

(54) METHOD AND SYSTEM FOR AUTOMATIC COMPUTATION CREATIVITY AND SPECIFICALLY FOR STORY GENERATION

(75) Inventors: Selmer Conrad Bringsjord, Brunswick Hills, NY (US); David Angelo Ferrucci, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/471,689

(22) Filed: Dec. 23, 1999

(51) Int. Cl.
*G06F 17/00* (2006.01)
*G06F 15/00* (2006.01)
*G06N 5/00* (2006.01)

(52) U.S. Cl. ...................... 706/45; 715/501.1; 715/530
(58) Field of Classification Search ................ 706/45, 706/50, 61, 62, 12, 48, 59, 55
See application file for complete search history.

(56) References Cited

U.S. PATENT DOCUMENTS

| | | | | |
|---|---|---|---|---|
| 4,637,799 A | * | 1/1987 | Bouchal | 434/236 |
| 4,684,135 A | * | 8/1987 | Bouchal | 273/269 |
| 5,119,474 A | * | 6/1992 | Beitel et al. | 706/45 |
| 5,274,758 A | * | 12/1993 | Beitel et al. | 706/45 |
| 5,356,296 A | * | 10/1994 | Pierce et al. | 434/317 |
| 5,435,726 A | * | 7/1995 | Taylor | 434/128 |
| 5,600,780 A | * | 2/1997 | Hiraga et al. | 395/334 |
| 5,604,855 A | * | 2/1997 | Crawford | 395/173 |
| 5,694,523 A | * | 12/1997 | Wical | 706/45 |
| 5,717,438 A | * | 2/1998 | Kim et al. | 345/302 |
| 5,734,916 A | * | 3/1998 | Greenfield et al. | 715/530 |
| 5,805,784 A | * | 9/1998 | Crawford | 395/173 |
| 5,841,741 A | * | 11/1998 | Freeman | 360/71 |
| 6,061,675 A | * | 5/2000 | Wical | 706/45 |
| 6,105,046 A | * | 8/2000 | Greenfield et al. | 434/118 |
| 7,136,791 B2 | * | 11/2006 | Darwent et al. | 703/6 |
| 7,246,315 B1 | * | 7/2007 | Andrieu et al. | 715/706 |

FOREIGN PATENT DOCUMENTS

| | | | | |
|---|---|---|---|---|
| JP | 07037118 A | * | 2/1995 |
| JP | 08155144 A | * | 6/1996 |
| JP | 08263681 A | * | 10/1996 |
| JP | 08314890 A | * | 11/1996 |
| JP | 09016458 A | * | 1/1997 |
| JP | 10143488 A | * | 5/1998 |
| JP | 10171836 A | * | 6/1998 |

OTHER PUBLICATIONS

Bailey, P.; "Searching for Storiness: Story-Generation from a Reader's Perspective". Research Index [online], AAAI Fall Symposium on narrative Intelligence, Oct. 1999.*

(Continued)

*Primary Examiner*—Michael B. Holmes
(74) *Attorney, Agent, or Firm*—McGinn IP Law Group, PLLC; Stephen C. Kaufman, Esq.

(57) ABSTRACT

A computer-implemented method (and system) of automatically generating a story, includes selecting a theme of the story, examining elements of the theme and instantiating the theme, and using the theme to select and control other aspects of the story.

29 Claims, 6 Drawing Sheets

OTHER PUBLICATIONS

Laurel et al.; Interface and Narrative Arts: Contributions From Narrative, Drama, and Film. Human Factors and Computing Systems Conference Proceedings on Reaching Through Technology, 1991, p. 381-383.*

Steiner et al.; "Graphic StoryWriter: An Interactive Environment for Emergent Storytelling". Proceedings on Human Factors in Computing Systems, Jun. 1992, p. 357-364.*

Kuriyama et al., "Authoring Support by Interactive Genetic Algorithm and Case Based Retrieval". 1998 $2_{nd}$ International Conference on Knowledge-Based Intelligent Electronic Systems, Apr. 1998, vol. 1, p. 390-395.*

Elliott et al.; "Story-Morphing in the Affective Reasoning Paradigm: Generating Stories Semi-Automatically for Use With 'Emotional Intelligent' Media Agents". Proceedings of the $2^{nd}$ International Conference on Autonomous Agents, May 1998, p. 181-188.*

Mateas et al.; "Narrative Intelligence". Research Index [online], American Association for Artificial Intelligence, 1998.*

Mateas, M., An Oz-Centric Review of Interactive Drama and Believable Agents, Technical Report CMUCS-97-156, School of Computer Science, Carnegie Mellon University, 1997, Retrieved from the Internet: http://citeseer.nj.nec.com/24132.html.*

Bringsjord et al., Brutus and The Narrational Case Against Church's Thesis, Narrative Intelligence Symposium, AAAI 1999 Fall Symposium Series, Nov. 1999.*

Bringsjord, S., Is (Godelian) Model-Based Deductive Reasoning Computational?, The Minds & Machines Laboratory, Dep of Philosophy, Psychology & Cognitive Sciences, May 1999, Retrieved from the Internet: http://citeseer.nj.nec.com/bringsjord99is.html.*

Bringsjord et al., Artificial Intelligence, Story Generation and Literary Creativity: The State of The Art, NEC Research Index Nov. 1996, Retrieved from the Internet: http://citeseer.nj.nec.com/bringsjord96artificial.html.*

Bares et al., Realtime Constraint-Based Cinematography for Complex Interactive 3D Worlds, AAAI/IAAI, 1998, pp. 1101-1106.*

Bailey, P., Searching for Storiness: Story-Generation From a Reader's Perspective, Narrative Intelligence Symposium, AAAI 1999 Fall Symposium Series, Nov. 1999.*

Bickmore et al., Small Talk and Conversational Storytelling In Embodied Conversational Interface Agents, Narrative Intelligence Symposium, AAAI 1999 Fall Symposium Series, Nov. 1999.*

Boella et al., Understanding Narrative is Like Observing Agents, Narrative Intelligence Symposium, AAAI 1999 Fall Symposium Series, Nov. 1999.*

Davis et al., A Brief Overview of the Narrative Intelligence Reading Group, Narrative Intelligence Symposium, AAAI 1999 Fall Symposium Series, Nov. 1999.*

Stern et al., Virtual Babyz: Believable Agents with Narrative Intelligence, Retrieved from the Internet: http://www-2.cs.cmu.edu/afs/cs/user/michaelm/www/nidocs/Stern.html, Oct. 1999.*

Bers, M.U., Narrative Construction Kits: "Who Am I? Who Are You? What Are We?", MIT Media Laboratory, Narrative Intelligence Symposium, AAAI 1999 Fall Symposium Series, Nov. 1999.*

Nehaniv, C.L., Narrative For Artifacts: Transcending Context and Self, Interactive System Engineering-Univeristy of Hertfordshire, Narrative Intelligence Symposium, AAAI 1999 Fall Symposium Series, Nov. 1999.*

Isbister et al., Touring Machines: Guide Agents for Sharing Stories About Digital Places, Narrative Intelligence Symposium, AAAI 1999 Fall Symposium Series, Nov. 1999.*

Young, R.M., Notes On The Use of Plan Structures In The Creation of Interactive Plot, Department of Computer Science-Nor Carolina State University, Narrative Intelligence Symposium, AAAI 1999 Fall Symposium Series, Nov. 1999.*

Machado et al., Once Upon a Time, Narrative Intelligence Symposium, AAAI 1999 Fall Symposium Series, Nov. 1999.*

Crawford, C., Assumptions Underlying The Erasmatron Interactive Storytelling Engine, Narrative Intelligence Symposium, AAAI 1999 Fall Symposium Series, Nov. 1999.*

Dautenhahn, K., The Lemur's Tale-Story-Telling in Primates and Other Socially Intelligent Agents, Department of Cybernetics-University of Reading, Narrative Intelligence Symposium, AAAI 1999 Fall Symposium Series, Nov. 1999.*

Hayes-Roth et al., Interactive Fiction, IEEE Intelligent Systems, Nov. 1998, vol. 13, Iss 6, pp. 12-15.*

Mateas et al., Narrative Intelligence, American Association for Artificial Intelligence, 1998.*

Lawrence et al., Social Dynamics of Storytelling: Implications for Story-Base Design, Narrative Intelligence Symposium, AAA 1999 Fall Symposium Series, Nov. 1999.*

Meech, J.F., Narrative Theories as Contextual Constraints for Agent Interaction, Narrative Intelligence Symposium, AAAI 199 Fall Symposium Series, Nov. 1999.*

Rousseau et al., A Social-Psychological Model for Synthetic Actors, Proceedings of the 2nd International Conference on Autonomous Agents, 1998, pp. 165-172.*

Szilas, N., Interactive Drama on Computer: Beyond Linear Narrative, Narrative Intelligence Symposium, AAAI 1999 Fall Symposium Series, Nov. 1999.*

Clark, P., Story Generation and Aviation Incident Representation: Working Note 14, NEC Research Index, Jan. 1999, Retrieved from the Internet: http://citeseer.nj.nec.com/482540.html.*

Bringsjord, S., "Chess Is Too Easy", MIT's Technology Review, Mar./Apr. 1998, vol. 101, Iss 2, pp. 23-28.*

Bringjord et al., "Why Did Evolution Engineer Consciousness?", NEC Research Index, Apr. 2000.*

Character-based interactive storytelling Cavazza, M.; Charles, F.; Mead, S.J.; Intelligent Systems, IEEE [see also IEEE Intelligent Systems and Their Applications] vol. 17, Issue 4, Jul./Aug. 2002 pp. 17-24 Digital Object Identifier 10.1109/MIS.2002.1024747.*

From linear story generation to branching story graphs Riedl, M.O.; Young, R.M.; Computer Graphics and Applications, IEEE vol. 26, Issue 3, May-Jun. 2006 pp. 23-31 Digital Object Identifier 10.1109/MCG.2006.56.*

An intent-driven planner for multi-agent story generation Riedl, M.O.; Young, R.M.; Autonomous Agents and Multiagent Systems, 2004. AAMAS 2004. Proceedings of the Third International Joint Conference on 2004 pp. 186-193.*

Character-driven story generation in interactive storytelling Charles, F.; Mead, S.J.; Cavazza, M.; Virtual Systems and Multimedia, 2001. Proceedings. Seventh International Conference onOct. 25-27, 2001 pp. 609-615 Digital Object Identifier 10.1109/VSMM.2001.969719.*

IDIC: assembling video sequences from story plans and content annotations Sack, W.; Davis, M.; Multimedia Computing and Systems, 1994., Proceedings of the International Conference on May 15-19, 1994 pp. 30-36 Digital Object Identifier 10.1109/MMCS.1994.292430.*

Searching for Storiness: Story-Generation from a Reader's Perspective, Paul Bailey, (1999) Artificial Intelligence Division of Informatics The University of Edinburgh, United Kingdom.*

Selmer Bringsjord and David Ferrucci, "Artificial Intelligence and Literary Creativity: Inside the Mind of BRUTUS, a Storytelling Machine", Aug. 30, 1999.

Selmer Bringsjord, "Cinewrite: An Algorithm-Sketch for Writing Novels Cinematically, and Two Mysteries Therein", *Instructional Science*, 21:155-168, 1992.

Selmer Bringsjord, Paul Bello, and David Ferrucci, "Creativity, the Turing Test, and the (Better) Lovelace Test", *Minds and Machines*, 11:3-27, May 8, 2000.

Selmer Bringsjord, "Is It Possible to Build Dramatically Compelling Interactive Digital Entertainment (in the form, e.g., of computer games)?", *Game Studies*, Feb. 16, 2001.

Selmer Bringsjord, "What Robots Can and Can't Be", Dordrecht, the Netherlands: Kluwer, 1992, pp. 163-183.

Fred Charles, Steven J. Mead, and Marc Cavazza, "Character-Driven Story Generation in Interactive Storytelling", University of Teesside, Middlesbrough.

Peter Clark, "Story Generation and Aviation Incident Representation: Working Note 14", The Boeing Company, Jan. 26, 1999.

Lyn Pemberton, "A Modular Approach to Story Generation", School of Cognitive and Computing Sciences.

Margaret A. Boden, "Could a Robot Be Creative—And Would We Know?", in Ford, K.M., Glymour, C., and Hayes, P.J., eds., *Android Epistemology*, Cambridge, MA: MIT Press, pp. 51-72, 1995 (Abstract).

George Johnson, "Undiscovered Bach? No, a Computer Wrote It", *The New York Times*, Nov. 11, 1997, pp. F1-2.

Ray C. Dougherty, "Natural Language Computing: An English Generative Grammar in Prolog", Mahwah, NJ: Lawrence Erlbaum Associates, 1994 (Abstract).

Paul Bailey, "Searching for Storiness: Story-Generation from a Reader's Perspective", The University of Edinburgh, Division of Informatics.

J. Yellowlees Douglas and Andrew Hargadon, "The Pleasures of Immersion and Engagement: Schemas, Scripts and the Fifth Business", *Digital Creativity*, 2001, vol. 12, No. 3, pp. 153-166.

Andrew Gartland-Jones, "Can a Genetic Algorithm Think Like a Composer?", 5th International Conference on Generative Art, Dec. 11-13, 2002, Politechnico di Milano University, Milan, Italy.

* cited by examiner

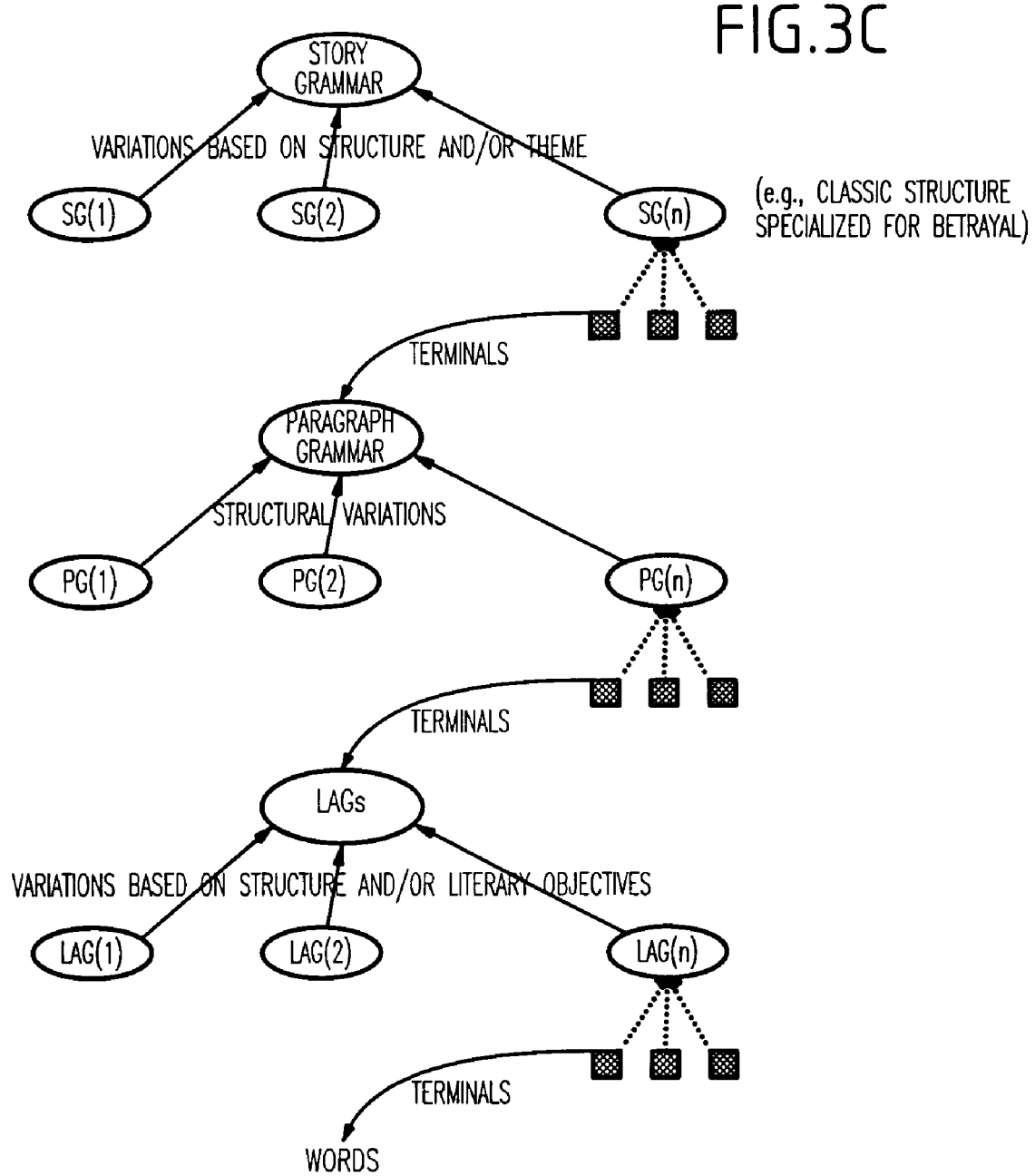

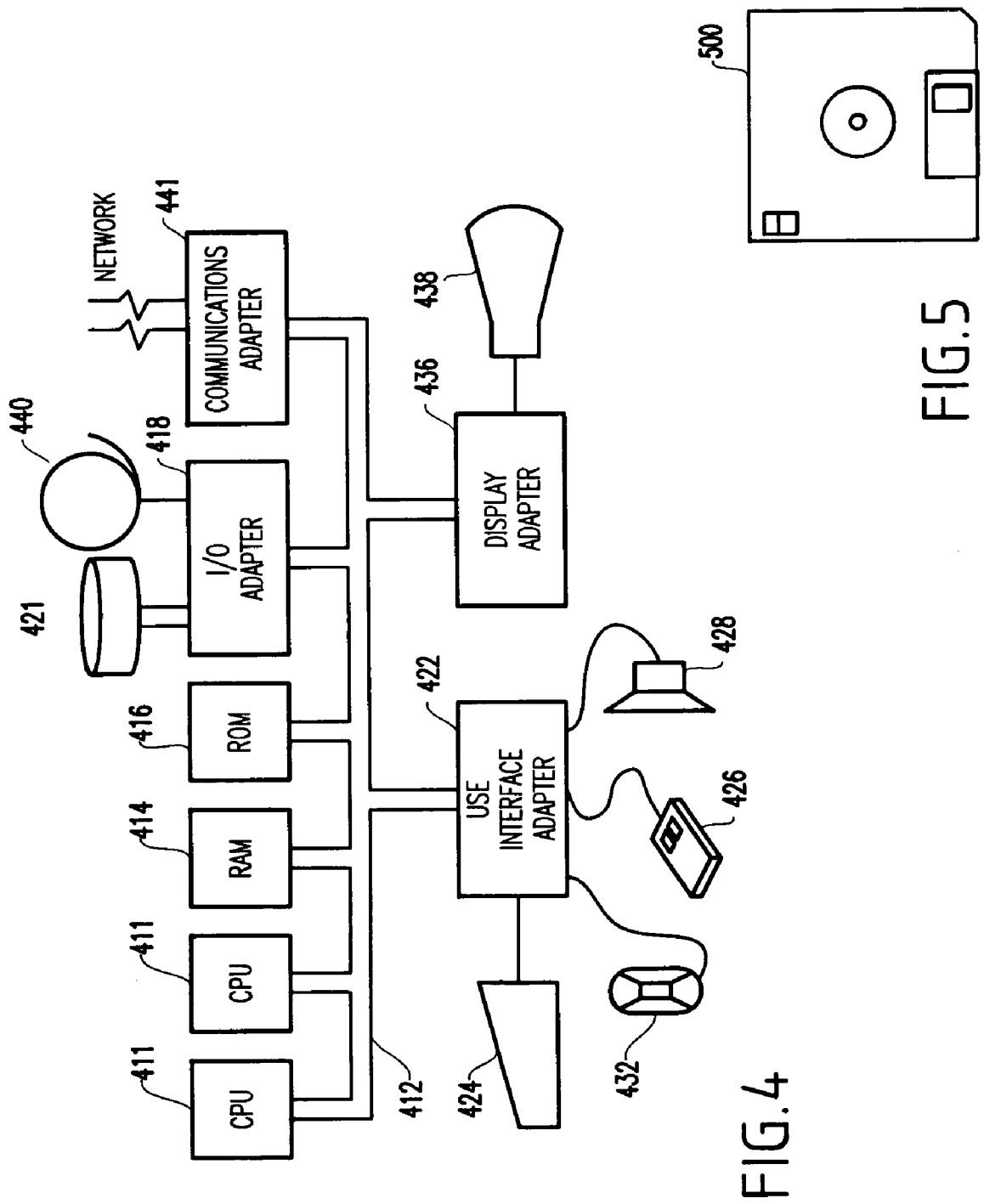

METHOD AND SYSTEM FOR AUTOMATIC COMPUTATION CREATIVITY AND SPECIFICALLY FOR STORY GENERATION

BACKGROUND OF THE INVENTION

1. Field of the Invention

The present invention relates to a computer system, and more particularly to a computer system and method for generating a plurality of artifacts in a specified language which people (e.g., humans) are likely to find interesting.

2. Description of the Related Art

The notion of general creativity, like intelligence, is ultimately a humanistic and subjective concept. Moreover, the notion of computational creativity is not bound to the same procedural attributes one might associate with human creativity.

Indeed, the procedural attributes of human creativity may remain largely a mystery, while the procedural attributes of computational creativity may be well-defined. This comparison is akin to the comparison between the human intelligence at work playing a game of chess and the computational mechanism at work in a computer that rivals the human player. Both mechanisms manifest an effective performance in, what humans consider, an intellectually demanding task. However, the procedural attributes of the human remain largely ill-defined, while the procedural mechanisms used by the computer may be rigorously explicated in a formal computational language and ultimately vary significantly from the human mechanism.

Therefore, the association of creativity with an agent is focused on manifest behavior, not on implementation. One ultimately judges an agent as "creative" if it can produce an interesting artifact in some language of expression (e.g., natural language, music, sculpture, etc.), starting from a point sufficiently distant from the end result.

Two key concepts in realizing a creative agent are the notions of interestingness and creative distance. "Interestingness" asks the question of: "will one find an agent's creation interesting or will one find it an incomprehensible blob with no communicative value?"

An agent may generate voluminous works that are never assigned any value by the agent's audience. The agent, rather than being judged creative, is considered an arbitrary generator of random artifacts. There are several ways to consider interestingness.

First, the agent may understand the cognitive cultural context of its audience well enough to invent the interesting. That is, the agent may extend and redefine the audience's cognitive cultural awareness with a novel creation and demonstrate its value. One typically associates genius with such capability. Computational creativity does not address genius.

A second way to create interesting artifacts is to begin with a known seed of interestingness (e.g., what is referred to as a "theme"). For example, it is known that particular stories about the fruits or snarls of romantic love have human interest. Variations based on skillful use of language, plot twists. rich characterizations etc. that appeal to audiences are considered creative and interesting, albeit perhaps short of genius.

While the output of a generative agent may be an interesting well-crafted story, a harmonious piece of music or a delicious recipe, the creativity of the agent is ultimately predicated on the input's creative distance from the output.

For example, if an agent for story generation requires a complete story as an input and outputs different stories differing from the input only by the names of the characters, then the agent, while legitimately generating a unique artifact, would not be considered creative. Indeed, the "distance" between the input and the output would be considered negligible and insufficient. Nor would the artifact produced by the agent effect significant human interest in light of the input.

However, if a literary theme such as the "evil of betrayal" or the "destructive force of ambition" were the input to the agent, and the agent output complete stories about the indicated theme varying according to characters, plot, story-structure and language, then the agent would be considered a "creative literary agent". The artifact, while anchored to the theme, would exhibit sufficient expansion (e.g., creative distance) relative to the input.

Any creative agent must begin with a seed of interestingness and maintain that theme in the generation of skillful variations that are sufficiently distinct from the input. Hitherto the invention, there has been no system which performed the above operations and in which interestingness and creative distance were even considered.

Thus, the conventional story generation system has been deficient in a number of areas as briefly discussed above.

Regarding knowledge sources, the conventional story generation system and method have used such sources only individually, in an unintegrated fashion. There has been no integrated, composite approach to story generation.

That is, the conventional methods have demonstrated analogs of lexical knowledge, in the form of natural language lexicons and grammars. Further, compositional knowledge, in the form of story grammars have been demonstrated. Additionally, domain knowledge, represented in many different ways from the logically formal (e.g., such as $(\forall(X) \text{ isa}(X, \text{ man}) \rightarrow \text{isa}(X, \text{ mortal}))$ $\hat{}\text{isa}(\text{socrates}, \text{man}) \Rightarrow \text{isa}(\text{socrates}, \text{mortal})$ to the ad hoc (e.g., such as "socrates was mortal becomes he was a man.").

However, these knowledge sources have neither been integrated and related to cooperative roles of an overall system architecture for story generation, nor of a more general architecture for computational creativity.

Regarding processes, the conventional story generation system and method has demonstrated process analogs for stage evolution, typically using planning and simulation techniques to generate story plots. Additionally, process analogs for structural expansion, typically using generative story grammars have been developed. Lastly, natural language generation has been developed.

Regarding system architectures, two basic architectures have emerged in story generation. The first architecture is based principally on plot development, whereas the second architecture is based on structural expansion. Both include some form of natural language generation.

An example of plot development through planning and simulation would be to provide a planning engine in which would implicitly ensure that the plot involved a character trying to achieve some goal. However, a problem is that sometimes a character's striving for a goal is tedious.

Thus, this approach to story generation is dominated by the process of plot expansion to produce variability in stories. However, the results have lacked a thematic anchor, and therefore struggled with the notion of "interestingness". They also had no explicit knowledge component or mechanism for achieving impressionism (or in the special case of story generation, rhetoric). Story structure is part of an explicit architecture, and thus cannot be easily expressed or varied.

Further drawbacks include no representation or process for producing interestingness, no representation or process for structure expansion, and no representation or process of identifying and exploiting impressionistic knowledge. Impressionistic knowledge captures how an artifact might impact or impress human sensibilities through style and form, rather than explicit content. Knowledge about how the sounds of certain words affect the reader is considered "impressionistic knowledge". Another example is knowledge about how different words, even though they may refer to the same thing, would produce different emotional states in the reader. Describing weapons of destruction as "ordnance" produces a different impression in the reader than describing them as "harbingers of death". This class of knowledge may be acquired through the practice and study of literature and rhetoric and/or may be acquired and inferred statistically.

Another conventional implementation approach is structural expansion through story grammars in which through iterative structural expansion of a story grammar provides and builds increasingly detailed outlines. However, in this approach it becomes extremely difficult to represent the complex plot and literary variations in the declarative forms required by story grammars.

Thus, this approach to story generation focused on generative grammars and ignored the potential to achieve creativity and variability through plot expansion.

Thus, hitherto the present invention, there has been no system and method adequate for story generation in which a creative agent could begin with a seed of "interestingness" and maintain that theme in the generation of skillful variations that are sufficiently distinct from the input.

SUMMARY OF THE INVENTION

In view of the foregoing and other problems, disadvantages, and drawbacks of the conventional methods and structures, an object of the present invention is to provide a method and system for story generation.

A further object of the invention is to provide a system and method for story generation in which a plurality of artifacts are generated in a specified language which humans are likely to find interesting.

Yet another object is to provide a system and method for story generation in which the theme of the story is selected initially and the theme is anchored for constraining subsequent choices made in generating the story.

Another object of the invention is to provide a system and method for story generation in which a creative agent begins with a seed of interestingness and maintain that theme in the generation of skillful variations that are sufficiently distinct from the input.

In a first aspect of the present invention, a computer-implemented method (and system) of automatically generating a story, includes selecting a theme of the story, examining elements of the theme and instantiating the theme, and using the theme to select and control other aspects of the story.

In a second aspect of the invention, a programmable storage medium is provided for storing a program implementing the steps of the inventive method.

With the unique and unobvious features of the present invention, story generation can take place automatically in which a plurality of artifacts are generated in a specified language which humans are likely to find interesting. Further, the story generation is provided by a creative agent which begins with a seed of interestingness and maintains that theme (e.g., anchors the theme) in the generation of skillful variations that are sufficiently distinct from the input.

Additionally, the present invention integrates a plurality of knowledge sources (e.g., compositional, domain, literary, etc.) relates them to cooperative roles of an overall system architecture for story generation.

Thus, the invention is a composite, theme-based story generation system and method. To provide the requisite interestingness, the invention provides a mathematization (e.g., formal representation) of the theme independent of plot, language, and story structure. The invention focuses on the theme (e.g., betrayal, the power of ambition to corrupt the soul, romantic love, etc.) as a critical aspect for providing "interestingness", and anchors the theme regardless of plot, characters, language, story structure, etc.

By doing so, plot, setting, characters, story structure, language, etc. can be varied while keeping intact/constant the essential element (e.g., theme) which keeps the story interesting and while making the theme permeate the entire story. As such, the theme influences all of the other aspects and processes of the story generation such as setting, characters and their properties, language, story structure, selection of the words, sentences, and paragraphs used in the generation of the language, plot, etc. and these other aspects can be varied while maintaining the theme which keeps the story interesting.

Additionally, besides orchestrating a composite architecture and making the inventive process theme-based, thereby creating wide variability in the other aspects of the story generation around the same theme, the invention also allows capturing/representing literary devices and techniques (e.g., using certain phrases, words, etc.) in order to evoke certain emotions from the reader.

Thus, for example, when generating a natural language, the system and method of the invention will use (and indeed will be constrained to use) certain words based on the theme selected and appropriately classified in a database which lead the reader to believe that the character (antagonist) is, for example, "psychologically conscious" or have some other property. Hence, only certain words might be available for usage based on certain themes. That is, the selection of the theme will constrain the words, phrases, etc. available for use in generating the story. Thus, the invention will be constrained to use certain words or phrases which would lead the reader to think the charter is psychologically conscious. Such words are preferably pre-classified, for example, in a database for use in generating the story grammar to evoke a predetermined literary response from the reader.

Unlike the conventional systems and methods which anchor the story to characters or plot, etc., the invention uses the theme and is captured independently to maintain a creative distance between the input and the output and to provide interestingness to the story.

BRIEF DESCRIPTION OF THE DRAWINGS

The foregoing and other purposes, aspects and advantages will be better understood from the following detailed description of a preferred embodiment of the invention with reference to the drawings, in which:

FIG. 3C illustrates the inventive system capturing the knowledge used by a story structure expansion step 308 and language generation step 307 (of the process shown in FIG. 3A) in a three-level grammar hierarchy;

FIG. 4 illustrates an exemplary information handling/processor system 400 for implementing the system and method of the present invention; and FIG. 5 illustrates a programmable storage medium 500 for storing a program implementing the method of story generation according to the present invention.

DETAILED DESCRIPTION OF PREFERRED EMBODIMENTS OF THE INVENTION

Figure 1:
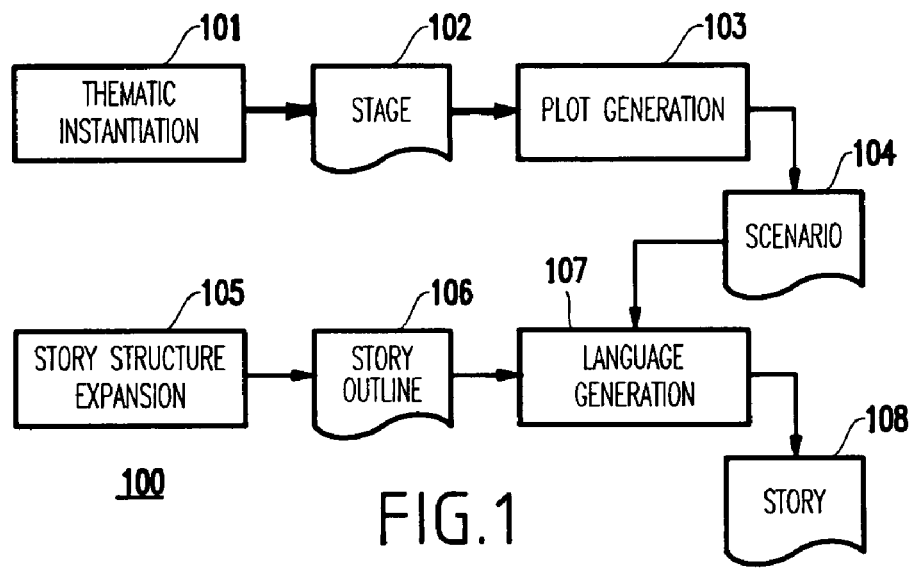
FIG. 1 illustrates a block diagram of a composite architecture 100 for story generation according to the present invention.

Referring now to the drawings, and more particularly to FIGS. 1-5, there are shown preferred embodiments of the method and structures according to the present invention. It is noted that, for consistency and clarity, the same reference numerals are used in different figures to represent identical steps and/or elements.

Referring to FIG. 1, a first embodiment of an upper level system block diagram according to the present invention will be described below.

FIG. 1 shows a composite architecture 100 which explicitly reflects a story generation process that starts with a symbolic encoding of a theme to anchor interestingness. A theme may be selected by the system or by a user as a first process of the invention.

The instantiation of the theme performed by a thematic instantiation module 101 from a knowledge-base of characters and events is used to input to a stage module 102, guide plot generation in a plot generation module 103 to input to a scenario module 104, perform story structure expansion via a story structure expansion module 105 to input to a story outline in story outline module 106, and natural language (e.g., English prose) generation via language generation module 107.

The result is a quicker path to scenarios and stories 108 that conform (necessarily) to the explicitly represented theme, which is likely to be interesting from the beginning. The idea of a composite architecture that "covers all the bases" with differentiated and independently varying components seems to have helped breathe new life into the vision of a storytelling AI.

FIG. 1 illustrates the orchestration of the inventive architecture's different components, including thematic instantiation, story expansion, and plot and language generation, all working together with different classes of knowledge.

Figure 2A:
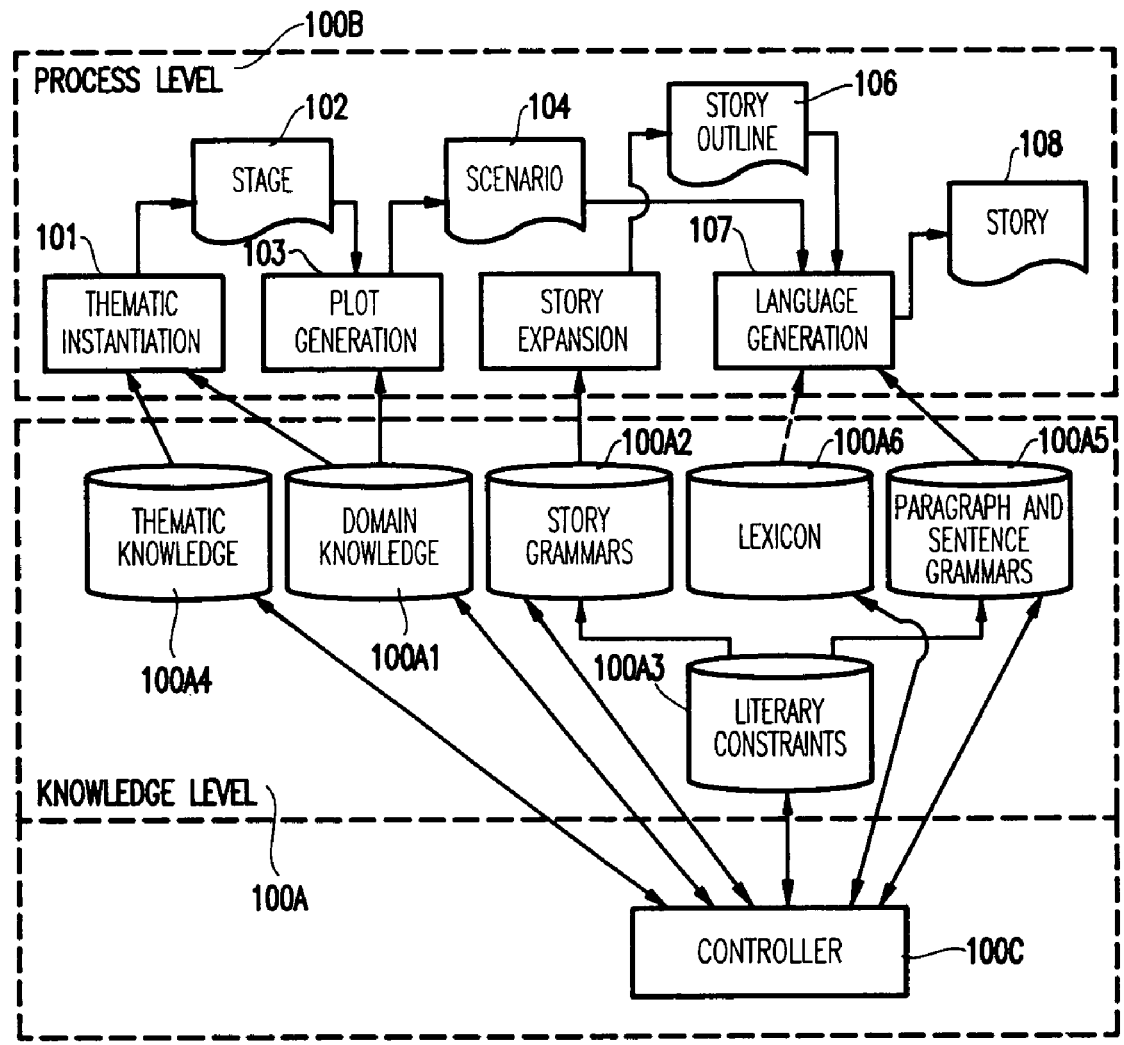
FIG. 2A illustrates the process level of the composite architecture 100 and the knowledge level(s) used by the composite architecture 100 according to the present invention.

FIG. 2A illustrates that the architecture of the inventive system can be decomposed into two levels including a knowledge level 100A and a process level 100B. Such levels interact with and are controlled by a controller 100C, as shown in FIG. 2A. Controller 100C controls the knowledge level, to perform the process level 100B. The controller 100C is programmed to perform the processes of the process level while interfacing with the knowledge level.

The knowledge level 100A comprises the different types of knowledge required to generate a written story about a particular theme. The process level 100A contains the processes (e.g., described briefly above with regard to FIG. 1) that together use the knowledge level 100 to generate a story. The process level represents the system's computational approach to story generation.

Prior to further describing the knowledge and process levels, it is noted that an exemplary implementation of the system and method of the invention has been developed using FLEX, a multi-paradigm artificial intelligence (AI) programming system based in the programming language Prolog. It is commercially available from Logic Programming Associates, Ltd., incorporated in the United Kingdom. Obviously, other systems could be used including other programming languages.

Turning now in detail to the knowledge level 100A, the knowledge level 100A contains representations of different types of knowledge required to generate the written story:

For example, the "knowledges", typically contained in databases or the like, include domain knowledge 100A1 (e.g., people, places, things, events, goals, behaviors, etc.), linguistic knowledge (e.g., sentences, phrases, words, parts of speech etc.) 100A2 ("paragraph and sentence grammars" 100A5 and "lexicon" 100A6), literary knowledge (e.g. thematic descriptions, literary structures, story grammars, etc.) included in "story grammars" 100A2, "thematic knowledge" 100A4 and "literary constraints" 100A3.

Generally, a story is a natural language description of objects, their attributes, relationships, behaviors and interactions. It may or may not be centered around any particular theme or have any particular message. A story may or may not be interesting (and, uninterestingness quickly follows from an absence of themes and structure). However, all stories include a description of some set of objects and their interactions.

Domain knowledge (e.g., 100A1) encodes a formal representation of objects, attributes, relationships, goals, behaviors, and events (e.g., a formal description of a domain). Domain knowledge is not the story itself, but is a description of a collection of concepts about which some story may be written.

Domain concepts may include the fundamental elements that might compose a story's settings (e.g., places, things, and their attributes and interrelationships), its characters (e.g., people, their physical and psychological makeup, their goals and behaviors) and the events that occur (e.g., steal, kill, murder, give, take, run, sign, buy, borrow, loan, kiss, etc.). Such domain concepts are formalized and stored into the domain knowledge storage 100A1.

Hence, a story is a description of a set of objects and events. The description itself is of course encoded in a natural language. A story therefore takes the form of a sequence of words of some language strung together to conform to the language's grammar. While domain knowledge may be considered a description of domain concepts, it does not qualify as a story because, among other reasons, the description is not encoded in a natural language.

Linguistic knowledge is knowledge required to produce a natural language description of domain concepts from a formal, logical representation of domain knowledge. Linguistic knowledge formally describes the linguistic structure of paragraphs, sentences, phrases, and words. It categorizes words of a lexicon as verbs, nouns, adjectives, adverbs, etc.

Literary Knowledge is also used by the invention. With but a little domain knowledge and some linguistic knowledge, a story generation system can produce a story. However, the story likely will not be particularly interesting. A weak story may look more like a laundry list (e.g., of descriptions of places, things, people, and events) than engaging narrative. Such a story does not have a theme or a message, nor will it be told in a way that holds readers or steers them toward some intended meaning.

Literary knowledge is independent of a story's domain content or grammatical integrity. It is knowledge of the high art of storytelling. Literary knowledge enables the compelling communication of interesting interpretations of domain knowledge through the medium of natural language.

Generally, the "Story Grammars" 100A2 and "Literary Constraints" 100A3 of FIG. 2A make-up Compositional Impressionistic Knowledge (CIK) (discussed below with regard to FIG. 2B) and "Paragraph and Sentence Grammars" 100A5, "Lexicon" 100A6, and "Literary Constraints" 100A3 make-up Lexical Impressionistic Knowledge (LIK) (discussed below with regard to FIG. 2B). More generally, all together they represent the components of Impressionistic Knowledge.

Specifically, the inventive system encodes literary knowledge to generate stories that can achieve key literary objectives, including 1) triggering readerly imaging, 2) project psychological consciousness, 3) engage readers in classic themes, and 4) instantiate classic story structures.

1) and 2) are achieved through the characterization and selection of words, phrases, sentence, and paragraph structures in terms of their ability to trigger images and psychological-consciousness in the reader. 3) is achieved through the formalization of thematic knowledge. This formalization is encoded as part of the literary knowledge-base in a structure referred to as a thematic relation. This relation is an implementation structure used to gather essential ingredients for a story about betrayal from a domain knowledge-base.

4) refers to the familiar flow of a story such as how it is structured at a high-level in terms of setting, character introduction, etc. Story grammars are what we use to represent the high-level "look-and-feel" of story structure. These grammars are part of the literary knowledge-base (KB).

One can view the domain knowledge-base as a pool of story elements (characters, places, things, events, etc.) that can be configured to produce any number of stories about any number of themes.

The literary knowledge-base's thematic relation defines a particular theme independently of any particular set of domain elements. It is used to identify a set of elements from the domain and their interrelated roles required to tell a story about that theme. The literary knowledge base 100A3's story grammars are used to orchestrate the high-level structure of the story that determines which paragraphs to write first and what sentence forms they contain. Literary knowledge is also used to select the key words and phrases that best communicate the theme by triggering readerly imaging and projecting P-consciousness. Finally, linguistic knowledge is used to configure grammatically correct English sentences.

Thus, as shown in FIG. 2A, the present invention utilizes many knowledge sources. For example, the invention uses Lexical Knowledge (LK). That is, the Language of Expression, L, is the medium in which the artifact is manifest.

For story generation, the medium is typically some natural language like English or German. Obviously, any language understandable by a human is possible. For music generation, it would be musical notes for example.

A grammar for L (e.g., G(L)), describes syntactically valid ways of combining elements of L. (This is stored in "paragraph and sentence grammars" 100A5 of FIG. 2A.)

The invention also utilizes Compositional Knowledge (CK). That is, the language of Artifact Composition, C, is a language naming structural components used to assemble an artifact. For example, in story generation, the language of composition would include names of things such as introduction, climax, conflict, setting, protagonist, antagonist, resolution, etc. In cooking, the language of composition might include things such as side dish, sauce, glaze, dessert, etc.

C is L-neutral (e.g., language expression neutral). For example, the same language of composition for stories would apply regardless of whether L was German, English, Chinese or some other natural language (e.g., spoken language understandable by human beings).

A grammar for C (e.g., G(C)), describes valid ways of structurally combining elements of C. For story generation, G(C) is typically called the "story grammar" 100A2. The story grammar is a type of outline of the story in which the sequence of activities are presented.

As mentioned above, the present invention also utilizes Domain Knowledge (DK) 100A1, which is a representation of objects, agents, attributes, activities, events, goals, behaviors, etc. that exist in some world (e.g., real or artificial) that the elements of L are intended to represent. In story generation, for example, domain knowledge would include a representation of characters and their behaviors, actions, objects etc. In music generation, domain knowledge may include a representation of instruments and their characteristics and different ways to play them (e.g., potential behaviors).

Figure 2B:
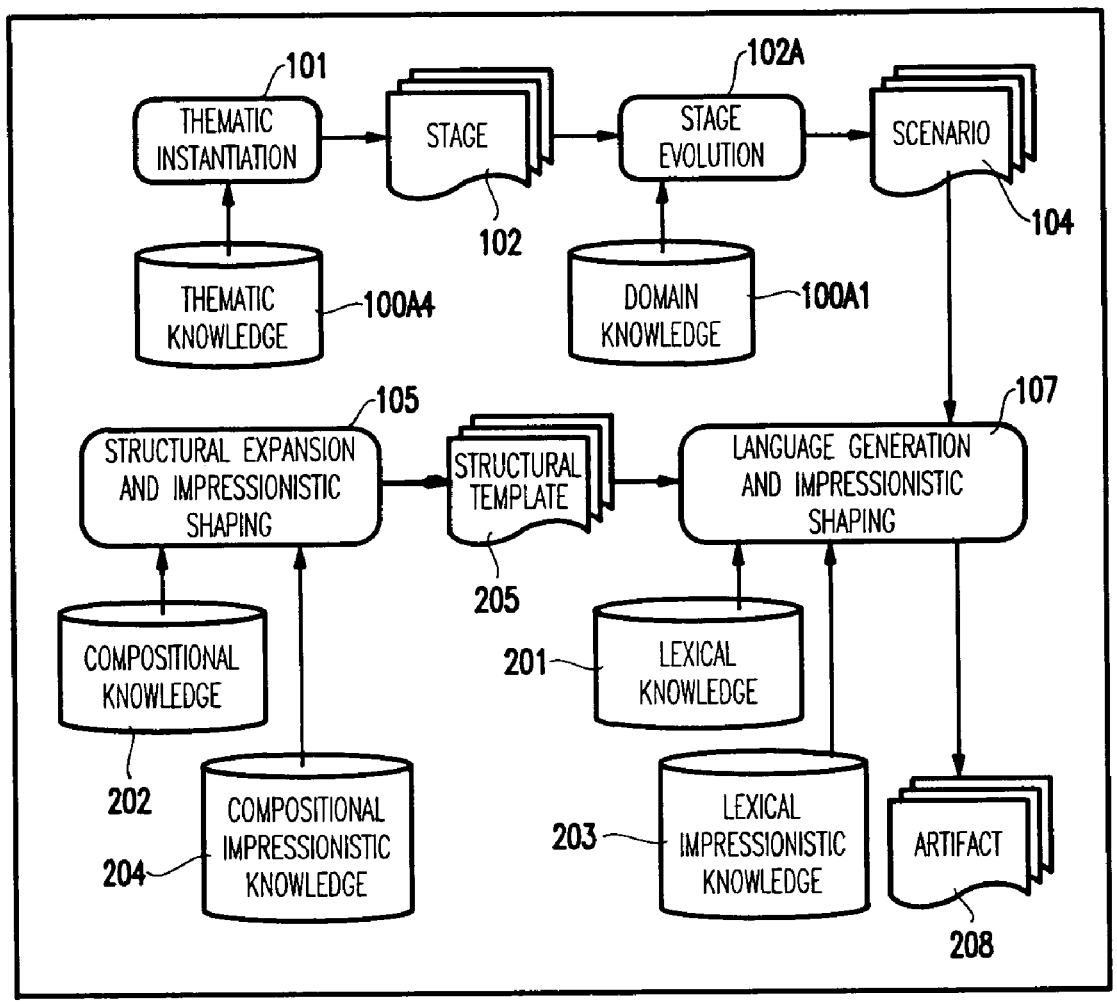
FIG. 2B is another view showing the generalized form of the invention's different process steps and knowledge bases used by each step.

Referring to FIG. 2B, a generalized form of the invention is shown (e.g., for producing an artifact 208 as opposed to necessarily a story 108 showing in FIG. 2A). Generally, the "Story Grammars" 100A2 and "Literary Constraints" 100A3 of FIG. 2A make-up Compositional Impressionistic Knowledge (CIK) (discussed with regard to FIG. 2B) and "Paragraph and Sentence Grammars" 100A5, "Lexicon" 100A6, and "Literary Constraints" 100A3 make-up Lexical Impressionistic Knowledge (LIK) (discussed with regard to FIG. 2B). More generally, all together they represent the components of Impressionistic Knowledge. The invention also utilizes Impressionistic Knowledge (IK). This knowledge is captured in application of "literary constraints" 100A3 to "story grammars" 100A2 and "paragraph and sentence grammars" 100A5. Impressionistic knowledge represents the effects that different language or compositional elements of the lexical and compositional knowledge sources 201, 202 may have on the audience. In literature, this type of knowledge is considered "rhetoric". The usage of certain words or sets of words in the construction of sentences will produce different types of impressions on the reader, ultimately affecting communicative results.

Further, the invention uses Lexical Impressionistic Knowledge (LIK) 203. LIK is a specific type of impressionistic knowledge. In terms of FIG. 2, it is stored in "paragraph and sentence grammars" and in "literary constraints" databases. It is realized in the artifact by the application of literary constraints to the expansion of the paragraph and sentence grammars. Lexical impressionistic knowledge 203 relates lexical elements and/or phrases, thereof; to their impressionistic effects. This knowledge is used to shape the expression in L to achieve different impressionistic effects on the audience.

There are a variety of devices used by authors to emotionally impress their audience. For example, in story generation, different classes of words or sentence structures may be used to produce tenor or suspense in the mind of the audience. Other devices involve selecting certain classes of verbs to known to communicate psychological consciousness of their subject.

The system and method of the present invention also uses Compositional Impressionistic Knowledge (CIK) 204. CIK is a specific type of impressionistic knowledge represented by the application of "literary constraints" 100A3 to "story grammars" 100A2. Compositional impressionistic knowledge relates compositional elements and/or phrases thereof to their impressionistic effects. This knowledge is used to shape the structure of an artifact to achieve different impressionistic effects.

For example, in story generation, a story may open with a tragic event that chronologically belongs at the end of the story. Such a story order may be for the purposes of "shocking" the audience. The shocking hook is an impressionistic effect. Its association with an alternative story structure is part of the CIK 204.

Furthermore, as mentioned above, thematic knowledge (TK) 100A4 is used by the invention. That is, the inventive system and method introduce the explicit notion of a theme T and a language for expressing themes, T. The introduction of the theme assists in: 1) maintaining a certain "creative distance" between the input and output of the creative agent; and 2) focusing the agent on producing interesting artifacts. Distance between the input and the output is maintained by the subsequent elements of the process of story generation being anchored to (e.g., constrained by) the theme selected. In this regard, along with the random generator encompassed in the controller, the system can produce interesting artifacts.

It is noted that, while each of the "knowledges" are shown as separate storages/databases in FIGS. 2A and 2B, a single, partitioned database may be provided, as would be known by one of ordinary skill in the art taking the present specification.

Figure 2C:
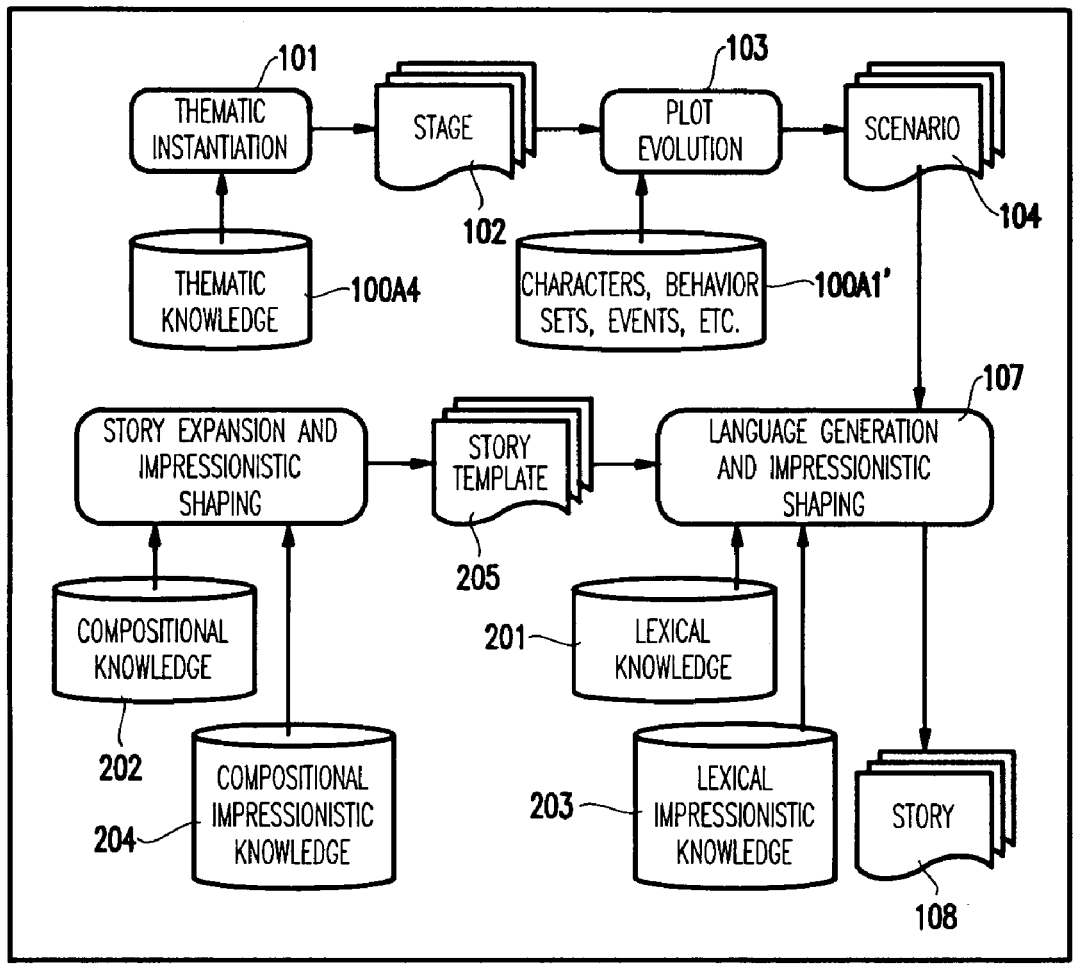
FIG. 2C shows the inventive process (and the accessing of respective knowledge bases) specialized for story generation.

FIG. 2C illustrates the generalized form of the invention (e.g., of FIG. 2B) having been specialized for story 108 generation. In FIG. 2B, the steps of structural template 205, stage evolution 102A, etc. are described further below with regard to FIG. 3.

Formalizing a Theme

Turning now to how to formalize a theme, thematic knowledge is a collection of themes. Composing particular themes in T (e.g., in natural language) is the job of the human. The creation of interesting themes is outside the scope of the present invention.

A thematic expression in T may be expressed in a syntactic structure of a formal language, like first-order logic or FLEX. A theme is the primary input to a creative agent of the inventive system. The theme may be input by the controller 100C accessing the thematic knowledge 100A4 and selecting a theme (e.g., betrayal, etc.), or by the user selecting a theme. The following is an example representation of "Betrayal" in the language FLEX.

betray(Betrayor, Betrayed):—
  Evil is some goal whose plan is an EvilPlan
    and whose agent is a Betrayor
    and Saying is included in the EvilPlan
    and Saying is some say
    and Thwarting is included in the EvilPlan
    and Thwarting is some thwart
    and Betrayeds_Goal is the prevented_goal of Thwarting
    and Betrayors_Lie is the theme of the Saying
    and Betrayors_lie is some support of the Betrayeds_Goal
    and Betrayed is some person
      whose goal is the Betrayeds_Goal
      and whose beliefs include the Betrayers_Lie.

The symbols beginning with a capital letter are variables. The system of this invention will search for and produce appropriate values for those variables as part of the story generation process.

Other elements of this FLEX representation refer to primitive structures supplied in the thematic knowledge-base (e.g., "lie", "thwart", "plan"). These elements are thematic building blocks includes as part of this invention. The input command is a simple selection. Choosing from a multiple choices of pre-defined themes stored in the knowledge-base. It is simplistic. The casual user, however, does not define the theme. Someone capable of representing knowledge in first-order logic or in FLEX for example (both well-defined formal systems accessible to any logician or engineer) would be capable of creating the requisite representation for a theme using elements from the thematic knowledge base only. These elements would include, in the example of "betrayal" predicates like "betrayer", "betrayed", "evil goal", "betrayer's objective", etc. These elements would be combined in a formal expression to create the theme's "input" representation (i.e., the representation stored in the knowledge base). Once stored, the user might select it, among others, by some name (arbitrarily selected by the person who created the theme's formal or "input" representation".

It is noted that it is possible to design and implement a system that would allow a casual user to compose a theme's formal representation from constituent elements, stored in the thematic knowledge-base, without prior knowledge of the formal language. This, however, is not part of the current invention.

A theme is independent of the language of expression, the language of composition, domain knowledge and impressionistic knowledge. The elements composing the representation of the theme are drawn from thematic knowledge only. They are independent of the other classes of knowledge and they are independent of the mechanisms that result in the story's plot, language, style and structure.

Such independence is an important aspect of the present invention. It ensures the "creative distance" between the input and the output by constraining the process choices made subsequently. The selection or even construction of the input theme may be accomplished without access or prior knowledge of the classes of story generation knowledge or process. Based on the theme alone, the story will make selections to produce a variety of stories about the selected theme.

While large and varied knowledge sources will lead to varied, well-structured artifacts, the theme anchors the creative agent to producing "interesting" artifacts where interesting is ultimately defined subjectively by the human composing the theme. The theme performs such anchoring by constraining subsequent choices made by the controller 100C/random generator in the plot, characters, dialogue, setting, literary structure, etc.

PROCESS OF THE INVENTION

Figure 3A:
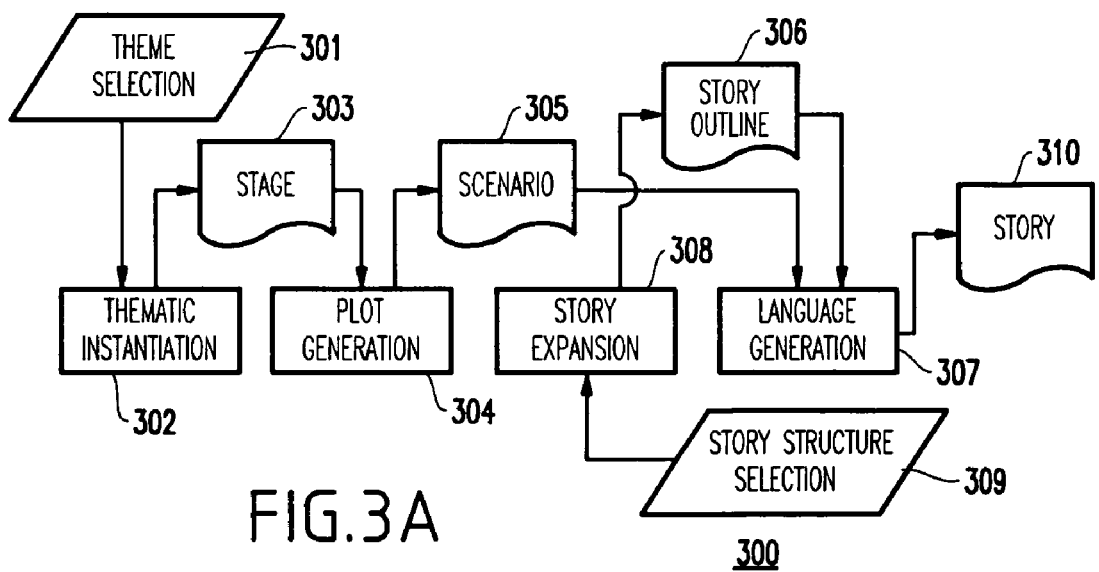
FIG. 3A illustrates a flowchart of the method for story generation according to the present invention.

Turning now to FIG. 3A, the story generation method/process 300 of the invention will be described hereinbelow. It is noted that while different reference numerals are shown in FIG. 3A than in FIG. 1 and FIG. 2, the method of the invention shown in FIG. 3A is substantially the same as that shown in the composite architecture 100 shown in FIG. 1 and the process level of FIG. 2.

In the inventive system, the story generation process 300 is decomposed into four high-level processes including thematic concept instantiation, plot generation, story structure expansion, and language generation. Each process uses knowledge represented as part of the knowledge level and stored in the inventive system's knowledge-base.

First, in step 301, a theme is selected by either the system (controller) or by a user from the thematic knowledge.

Then, based on the theme selected, the theme is instantiated in the thematic instantiation step 302. Thematic concept instantiation begins with a description of a theme. This description is independent of specific objects or events that might appear in a particular domain knowledge-base. Given a specific domain KB (e.g., reference numeral 100A1), the theme is instantiated, which serves to identify particular objects, events, characters, etc. from that KB to play the general roles required to realize the theme. The result of this process (e.g., step 302) is called a "stage" 303.

The stage 303 is input to a plot generation step 304. Plot generation 304, through planning and simulation, weaves the details of a specific plot for the cast of characters identified in the stage 303. Plot generation 304 completes what is called a scenario 305. The scenario 305 is the stage plus a completed set of events and the effects these events had on the state of world.

Story structure expansion 308 is the root of a separate process thread in the inventive system. A high-level story structure, represented in the inventive system as a story grammar, may be input or randomly selected. As already noted, story grammars describe how a story is organized with respect to introduction, character descriptions, conflict, resolution, conclusions, and so on. Story structures in the inventive system, are preferably independent of plot and theme.

The story expansion step 308 recursively expands structural components of a story represented in the story grammar until a series of paragraph types are reached. (It is noted that expanding a formal grammar to produce "grammatical" expressions of that grammar is well within the grasp of one ordinarily skilled in the art). Paragraph types are further expanded into a series of sentence types. The story expansion step 308 is performed in parallel to the steps 301-305 described above.

The result is a detailed story template (e.g., reference numeral 205 in FIG. 2C), or story outline 306, that may be entirely independent of story content. Literary constraints (e.g., from literary constraints knowledge 100A3 shown in FIG. 2) may be used to influence otherwise random choices in the generation of a story outline. It is through these constraints that decisions regarding theme or plot may carry over to achieve congruent influence over story structure.

The scenario 305 developed in plot generation step 304, along with the outline 306 produced in the story structure expansion 308, are input to the final process (e.g., language generation step 307). In this process, linguistic and literary knowledge are used to produce the written story 310.

IMPLEMENTATION OF THE INVENTION

In an exemplary implementation and as mentioned above, the inventive system was implemented using a variety of knowledge representation and programming techniques available in the logic-programming system called FLEX, originally developed by Logic Programming Associates (LPA), Ltd. FLEX is based in Prolog, a logic-programming language based on a general computational method that starts with a goal statement and searches a database of facts to find a proof for the goal. This method models a form of reasoning often referred to as "goal-directed reasoning." An in-depth treatment of Prolog can be found in Sterling et al., *The Art of Prolog* (Cambridge, Mass., MIT Press (1986)) and R. O'Keefe, *The Craft of Prolog*, (Cambridge, Mass.; MIT Press (1990)). The genealogy of logic programming is well-documented in J. A. Robinson, "Logic and Logic Programming", *Communications of the ACM*, Vol. 35:3, pages 40-65 (1992). The present inventors have also written on Prolog's genealogy, and its power in Bringsjord, S., and Ferrucci, D. "Logic and Artificial Intelligence: Divorce, Separated, Still Married . . . ?" *Minds and Machines*, Vol. 8; pages 273-308 (1998).

FLEX provides the developer with complete access to Prolog and enhances the paradigm with frame-based structures, relations, production rules, and an English-like syntax. The syntax and semantics of FLEX are well-documented in Vasey, P., *LPA-flex Technical Reference* (London, England; Logic Programming Associates Ltd. (1989).

Figure 3B:
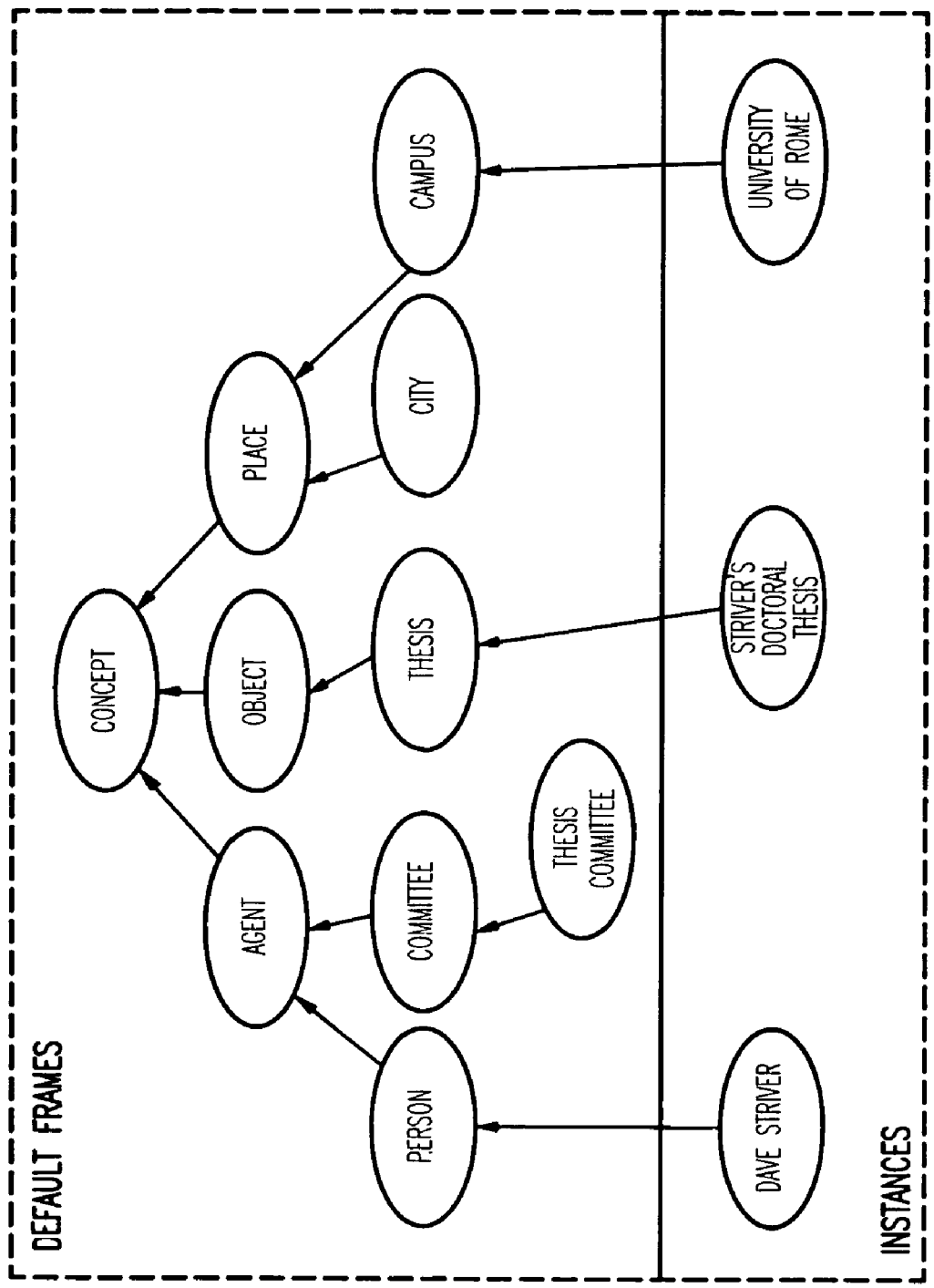
FIG. 3B illustrates a sample frame hierarchy, including some instances, for an exemplary story.

FLEX's frames allow the developer to group sets of facts around a specific domain entity, enabling a more intuitive structuring of the knowledge. A frame is used to represent a domain entity, and its attributes are used to represent facts or properties about that entity. From a programmer's perspective, frames are data structures that have a name and a set of attributes with default values. Frames can be organized in a generalization hierarchy via the relationship is-a. Attributes and default values are inherited from a parent in the frame hierarchy to its children. Instances are special kinds of frames that have actual values rather than default values. Instances are leaves in the frame generalization hierarchy. A sample frame hierarchy, including some instances, for an exemplary story, is illustrated in FIG. 3B.

A portion of a sample frame intended to represent the prototypical person, is shown below. Specific people would be represented as instances with specific values that might override the default values inherited from the person frame. The value for an attribute in a frame can be a list of things. Lists are represented by { }s.

frame person is an agent
default height is 5_5 and
default weight is 130 and
default gender is female and
default eye_color is brown and
default goals are {eat,sleep} and
default beliefs are {"computers write interesting stories"}

Relations in FLEX are used to define abstract properties about a frame or a sets of interrelated frames. Relations are processed by Prolog's goal-directed reasoning mechanism to find the specific frames and their elements that satisfy the relation.

For example, a relation may be developed to find all frames in a knowledge-base that contain the necessary features to play the role of the betrayed in a story about betrayal. The following FLEX relation (e.g., noted above and repeated here for ease of understanding) captures the abstract relationships between various persons, goals, plans and actions sufficient for the inventive system to identify the components of a simple story about betrayal.

relation betrayal_p
      if Evil is some goal whose plan is an EvilPlan
        and whose agent is a Betrayor
      and Saying is included in the Evilplan
      and Saying is some say
      and Thwarting is included in the EvilPlan
      and Thwarting is some thwart
      and Betrayeds_Goal is the prevented_goal of Thwarting
      and Betrayors_Lie is the theme of the Saying
      and Betrayors_lie is some support of the Betrayeds_Goal
      and Betrayed is some person
        whose goal is the Betrayeds_Goal
        and whose beliefs include the Betrayers_Lie.

The above relation is actual (exemplary) code. Strings starting with an uppercase letter are logic variables. The strings say and thwart refer to types of actions defined in the domain knowledge-base. Goals agents, and plans are also concepts defined in the domain RB. The English-like syntax of this relation is translated by the system into standard Prolog programs. These programs drive a goal-directed search through the knowledge-base and assign the logic variables to specific domain concepts.

Production rules or condition-action rules have a condition and an action. If the condition is met, the actions are executed. These rules are processed in FLEX by a forward reasoning engine. They are used in the inventive system to represent the reactive behavior of agents. The forward reasoning engine is exploited in the inventive system to provide a computational facility for simulation that runs in the course of plot generation. A set of production rules is input to the forward reasoning engine. All conditions are checked, and rules whose conditions are satisfied are "fired" (e.g., their actions are executed). The result of the actions may change the state of the KB, potentially causing other rules to fire. The process continues until all rules have been processed (some may fire and some may not). If no rules fire, then no rules were intended to fire. The wording "fail to fire" is intended to mean the rule did not fire because it was not supposed to given the current state of the knowledge-bases. There is not real "failure" of any kind. FLEX provides a variety of control features for specifying the order in which rules should fire and for resolving conflicts if more than one rule can fire at a time.

The Knowledge Level

Turning now in detail to the knowledge level, as mentioned above, domain knowledge 100A1 (in FIGS. 2A and 2B, with specialized domain knowledge 100A1' being shown in FIG. 2C) includes a static description of the world, or domain, about which a story is written. Domain knowledge includes descriptions of people, places, things, events, actions, goals, and behaviors. These descriptions are represented in the inventive system as FLEX frames.

Thus, for example, agents perform actions and participate in events. In stories about people, people are obviously an important class of agents. People are represented as agents with physical and psychological attributes. In addition to the typical physical attributes like height, weight, and eye color, a person's attributes include a set of goals and a set of beliefs. The latter set is an important element in plot generation, as would be evident to one of ordinary skill in the art.

Consider frame excerpts describing the characters Striver, a doctoral student/candidate at the University of Rome, and Professor Hart, Striver's mentor and one of three reviewing members of Striver's doctoral thesis, and who has intimated to Hart that Hart's thesis should pass any opposition. It is in part through the actions associated with characters' goals that a plot is developed from a stage. Hart's evilGoal refers to a goal that includes actions intended to prevent Striver from achieving his goal. The interplay of these various intentions is integral to the betrayal theme.

instance hart is a person
    name is 'Hart' and
    gender is male and
    goals is {evilGoal}.
    instance striver is a person and
    name is 'Dave Striver' and
    gender is male and
    goals is {to_graduate} and
    beliefs is {harts_promise}.

Events are concepts that relate people, places, and things. In the inventive system, the focus is on the specific event attributes required to facilitate representation of key story elements.

Hart and Striver are described as people with physical and psychological attributes. They are interrelated in the domain KB 100A1 through their roles in common events. For example, Striver's thesis defense is a thesis defense, which is a type of event, where Striver is the examined and Hart is a member of the examining committee. Among other attributes, the examined and the committee are the key elements of this event, which link Striver and Hart.

instance strivers_defense is a thesis_defense
    thesis is strivers_thesis and
    where is university_of_rome and
    examined is striver and
    committee is {hart,meter,rodgers,walken} and
    status is scheduled.

The set of beliefs associated with a person describes in part what that person believes is true about the world. However, that which a person believes need not be true In the inventive system, a person, by default, is assumed to believe all that is true about the physical state of the world as represented in the domain KB (e.g., hereinafter simply "the world"). This excludes knowledge about other people's psychological attributes or beliefs. A person is not assumed to have knowledge about other people's beliefs, goals, or behavior patterns, unless otherwise explicitly stated.

For example, if Hart states publicly that he supports Striver's success, then Striver, by default, believes this statement was made. However, the system does not conclude by default that Striver believes that Hart is telling the truth (or is lying). Statements about another person's beliefs are explicitly inferred in the inventive system. Explicit belief statements are included by the designer of the knowledge-base or may be inferred as the result of a rule.

Consider Striver's belief about Hart's promise to help Striver and support his thesis defense. A promise is a type of statement. An exemplary frame representing Hart's promise follows.

instance harts_promiae is a promise
    agent is 'Prof Hart' and
    utterance is 'I will sign your thesis at your defense.' and
    promised is 'Dave Striver' and
    intended_state is signatures of striver_thesis include 'Prof Hart'.

The intended_state associated with a promise describes some aspect of the state of the world that would be true if the promise were kept. The following exemplary frame demonstrates the representation of Striver's belief about the truth of Hart's promise:

instance striver is a person
name is 'Dave Striver' and
gender is male and
goals is {to_graduate} and
beliefs is {harts_promise}.

In the exemplary implementation, persons may also believe statements that contradict the current state of the world. For the person with the false belief, these contradictory statements override that actual state of the world. Contradictory or false beliefs must be stated explicitly in the list of beliefs associated with a specific person. For example, if the saying of harts_promise, represented by the following frame say101, instance say101 is a say
agent is 'Prof. Hart' and
statement is harts_promise.

existed in the domain knowledge-base and Striver did not believe that Professor Hart made the promise (i.e., that Hart uttered the statement), then Striver's beliefs must contain an explicit negative belief. The following frame represents that Striver does not believe that say101 occurred.

instance striver is a person
name is 'Dave Striver' and
gender is male and
goals is to_graduate and
beliefs is {not(say101)}.

Goals, plans, and actions are used to represent a character's proactive behavior. Once a character is set in motion, the character attempts to achieve its goal by executing the actions associated with the goal's plan. Each action has preconditions and state-operations. The pre-conditions ensure that the setting is right to execute the action; the state-operations attempt to change the state of the domain. If, for some reason, a state-operation fails to execute, then the action fails.

If all the elements of a plan succeed, then the goal is successfully completed by the corresponding agent. Goals, plans, and actions are considered part of the proactive behavioral model because they are initiated by the character as part of his or her explicit intentions.

A goal is a concept that has three main attributes of: 1) Agent: someone or something that can achieve the goal, typically a person; 2) Plan: a list of actions; and 3) Success state: a condition that if true would indicate that the goal has been satisfied.

For example, Hart may have the goal to destroy Striver's hope to graduate. To achieve this goal, there would be an exemplary sequence of actions that the agent, Hart, must execute. This sequence is the "plan". It may include, for example, conveying to the examining committee that Striver's ideas are worthless by refusing to sign his thesis. Hart may execute all elements of the plan, but there is no guarantee that his goal will succeed. A goal's success state is a condition which if true of some elements of the domain, indicates that the goal has been achieved (e.g., the agent has succeeded). In this case, a success state may be the failure of Striver's thesis defense.

The following frame represents Hart's goal to thwart Striver's goal to graduate.

instance evilGoal is a goal
agent is hart and
plan is {lie101, refuse_to_sign101} and
success is status of strivers_defense is failed.

lie101 and refuse_to_sign101 are specific actions that will execute during the plot generation step 304 on Hart's behalf when their preconditions are met.

Reactive behavior describes how a character reacts to changes or events in the world. Reactive behavior is represented by a set of condition-action rules (or production rules) associated with agents. If the condition is met, then the actions are executed.

With reactive rules, the inventive system allows character behavior to be described in terms of how a character may respond to different events independently of the character's specific goals. Reactive behavioral knowledge is ideal for describing basic elements of a character's default behavior independently of specific roles in a theme. It provides a representation mechanism for capturing particular behavioral dimensions that "trademark" a character.

Rules associated with a character's behavior may be as specific or as general as the knowledge-base designer feels is appropriate For example, Professor Hart might have specific behavior rules that describe exactly how he may react to a given state. Alternatively, without a specific rule, Professor Hart might react according to a default behavioral rule associated with all persons.

Reactive behavior in the inventive system functions both to increase the variability of a plot's outcome during simulation and to produce dialogue.

The inventive system combines proactive and reactive behavior in simulation in order to vary plot generation while still maintaining a theme-driven focus. The thematic frame sets key characters in motion by triggering their proactive behavior. Effects may, in turn, trigger the reactive behavior of other characters who can twist the plot by helping or hurting a character's proactive agenda.

The following production rule describes the typical reactive behavior of, for example, a member of a thesis committee. In summary, this rule states that if a member of a thesis committee is asked by the chair of the committee to sign the candidate's thesis, the member reacts by signing the thesis.

rule committee_members_behavior
IF
Candidate is some person and
Thesis is the thesis of Candidate and
the committee of the Candidate includes Member and
Request_To_Sign is some request and
Member is the requestee of Request_To_Sign and
the requester of Request_To_Sign is the chairman of the committee and
Thesis is the document of subject of Request_To_Sign and
status of Request_To_Sign is pending
Then
do answer(Member, Request_To_Sign) and
do sign(Member, Thesis).

Proactive behavior, by default, overrides reactive behavior. In the above-mentioned exemplary story of betrayal, for example, Professor Hart intends to thwart Striver's goal to graduate, by refusing to sign his thesis. Professor Hart does not react like a typical committee member. His proactive refusal to sign Striver's thesis must override (e.g., constrain) the reactive behavior imposed by the production rule previously described.

Such is accomplished in the inventive system by ensuring that all actions associated with plans are given a chance to execute in response to changes in the knowledge-base before production rules are fired in response to the same changes. In the exemplary case, the fact that Professor Hart refused to sign the thesis would occur first, ensuring that the reactive rule would not execute for him, since the request directed to Professor Hart would no longer be pending when the reactive rule fired.

By changing behavioral rules and/or actions, and activating different sets of rules, the simulation process will unfold different plots about the same theme and the same stage. For example, varying Professor Hart's reaction to pressure from the chairman to sign the thesis can result in a happy or sad ending for the candidate, Dave Striver. While the story is still about betrayal, the difference revolves around whether or not the betrayer succeeds in the quest to thwart the betrayed's goals.

While domain knowledge, the thematic relation, and the results of simulation determine what the inventive system will write about, how the inventive system will express the story is determined by linguistic and literary knowledge.

As described above, linguistic knowledge is knowledge about natural language. The written story is formed from "legal" expressions in a natural language. For example, in the inventive system, the natural language may be English, German, etc.

Linguistic knowledge is explicated through observations of how humans express internal knowledge in distinct language structures. Linguistic theory describes language structures at a number of different levels. These levels include: 1) Discourse; 2) Paragraph; 3) Sentence; 4) Phrase; and 5) Word.

The discourse level may be viewed as the most aggregate level, and is composed by configuring elements from the paragraph level. The paragraph level, in turn, is composed by configuring elements from the sentence level, and so on.

Words are defined as the smallest independent units that can be assigned descriptive meaning. However, words can be further decomposed into sets of letters that act as prefixes, roots, and suffixes. These can be combined to form different words. The study of how these combinations occur is termed "word formation morphology". The morphology of words may be influenced by semantic properties relating to number, gender, case, tense, etc. The study of the forms of words as they relate to these properties is termed "derivational morphology". Finally, words may take on different forms based on agreement with the forms of other words which occur simultaneously in a phrase. For example, the number of a noun influences the form of the verb in a noun phrase. The study of the types of agreement and how they influence the form of words is termed "inflectional morphology".

Encoded in the linguistic knowledge-base are a lexicon containing a set of words and the morphological rules necessary to demonstrate story generation examples. R. C. Dougherty, *Natural Language Computing: An English Generative Grammar in Prolog* (Lawrence Erlbaum Associates; Mahwah, N.J. (1994) provides details on encoding morphological rules.

In general, a sentence in a natural language, L, is a string of words taken from a fixed list of words that constitute L's lexicon. A natural language grammar for L is a device that distinguishes the grammatical from the ungrammatical sequences of words. This defines the valid (i.e., grammatically correct) sentences of L. For a treatment of formal grammars for a subset of English, and their use in mechanized communication, the present inventors refer to S. Russell et al. *Artificial Intelligence: A Modern Approach* (Prentice-Hall, Englewood Cliffs, N.J. (1995).

The inventive system encodes (e.g., via the controller and its interfaces with the "Story Grammars" knowledge base 100A2 and its interfaces with the story expansion and other process steps of the invention), as Prolog goals, a variety of sentence-level grammars, which include phrase-level grammars, for generating grammatically correct sentences. These generative grammars presuppose lower level linguistic procedures to ensure, among other things, verb/subject agreement, punctuation, etc.

Sentence grammars are categorized in the inventive system to represent classes of sentences that have a particular structure. These sentences vary around pivotal elements. Inventive system uses numerous sentence grammars. Some examples include sentence types designed to describe a setting, to describe a character, to reveal a character's goals, to narrate different classes of events, etc. Variations can result in the generation of a negative or positive tone, or the selection of words to produce different classes of imagery.

As an example, a sentence grammar for producing a sentence type called an "independent parallel setting description" is illustrated below:

INDPSD→SETTING verb FP
FP→"its" FEATURE FP 'its' FEATURE
SETTING→noun_phrase
FEATURE→noun_phrase In sentence grammars, uppercase words in the grammar are non-terminals. Words in quotes are literals used exactly as is in a generated sentence. Lowercase words are terminals in the sentence grammar. The terminals are phrase- or word-types that are selected and/or constructed from the available lexicon when a sentence is generated. Sentence generation procedures use sentence grammars to produce individual sentence that conform to the grammar. Typically, certain elements are fixed in the application of a sentence generation procedure. Inventive system supports different generation procedures for the same grammar. A generation procedure pivots around the elements which it allows to be fixed. For example, a procedure that pivots on SETTING will generate all possible sentences that can be built from the lexicon where SETTING is fixed to a particular noun. Other sentence generators for a given grammar may pivot on more than one element.

An example of an independent parallel setting description sentence where SETTING is fixed to the noun university is as follows:

The university has its ancient and sturdy brick, its sun-splashed greens, and its eager youth.

Thus, a noun that is a setting is chosen, and some possessive verb is used to link the setting to a list of feature phrases that describe a set of objects considered characteristic of the setting.

For sentences of the above form to have literary effect, elements of the sentence preferably are somehow associated with literary knowledge. As described below with regard to linking literary and linguistic knowledge, augmented grammars that enhance linguistic structures with literary objectives are described.

A description at the discourse level in the inventive system is realized by a structure called the "story grammar" described above. As mentioned above, such a grammar describes, at a high level, how the story will be laid out in terms of paragraphs that describe the setting, characters, and events that make up the story. The stories generated can be viewed as literary concepts as opposed to linguistic concepts, since they are ultimately language-independent. Indeed, the same story grammar can be used to both lay out the frames in a silent movie and generate a written story.

While the linguistic knowledge-base identifies types of words, phrases, and sentences as they function in the English grammar, as mentioned above, literary knowledge describes different ways to use words and phrases together to achieve a variety of literary objectives.

Literary objectives may include generating imagery in the reader's mind, suggesting a character's landscape of consciousness, and producing a positive, secure mood, or a negative, anxious one for the reader. Literary objectives like these may be achieved by selecting appropriate words and sentence structure combinations. Literary concepts, found in the inventive system's literary knowledge-base, define attributes of linguistic concepts as they relate to domain concepts so that text generation procedures can produce expressions that achieve literary objectives.

Objects described in the domain knowledge-base are interrelated and linked to linguistic concepts (e.g., words, phrases, etc.) as one way of capturing literary knowledge. The resulting associations between concepts and language elements are called "literary associations". They are used to generate sentences that satisfy specific literary objectives.

The inventive system includes a plurality of types of literary associations including: 1) Iconic features; 2) Literary modifiers; and 3) Literary analogs.

For example, objects are related to other objects in the inventive system via an attribute called "iconic features". An object's iconic features are represented as a list of other objects that are typically associated with the first object in literary settings. For example, ivy and clocktowers might be iconic features of a university (as in the exemplary story mentioned above). Wheels, engines, and speed might be iconic features of a motorcycle. The list of iconic features associated with an object is further specialized with respect to general notions of positive or negative imagery. This classification is highly subjective and may vary with respect to context. However, it can be very effective for imaging.

Consider the following frame fragment describing a university.

frame university is a object
    default positive_iconic_features is
        {clocktowers. brick ivy, youth, architecture, books, knowledge. scholar, sports) and
    default negative_iconic_features is
        {tests, competition, "intellectual snobbery"}.

In this frame, ivy is listed as a positive iconic feature of a university, while tests is listed as a negative one. Though the subjectivity of these classifications is apparent, the representational framework allows for capturing and configuring a variety of literary descriptions.

Additionally, there are positive and negative literary modifiers. That is, the concept of literary modifiers is an association between modifiers and the objects that they typically modify. In the inventive system, these associations are grouped into positive and negative classes. The associations are linked to the frames representing the modified objects with the attributes positive_literary_modifiers and negative_literary modifiers.

As is the case with iconic features, the negative and positive classification of literary modifiers is entirely subjective, but nonetheless this classification is profitably configurable in the literary KB. For example, given the frame for university and the following frame fragment for ivy frame ivy is an object
    default positive_iconic_features is {leaves. vines) and
    default negative_iconic_features is {poison} and
    default negative_literary-modifiers is {poisonous tangled} and default positive_literary_modifiers is {spreading. green, lush}.

a text generation procedure for independent parallel setting description sentences can produce positive imagistic sentences such as The university has its lush, green ivy.

If the knowledge-base were reconfigured and ivy was also listed as a negative iconic feature of university, then the following negative imagistic sentence can be exemplarily produced:

The university is full of tangled poison ivy.

Sentence generation in the inventive system are parameterized and can be called to produce negative or positive phrases.

Literary Analogs Metaphors are used in order to support sentence types in the inventive system. These literary devices are supported by an underlying representation structure called "literary analogs". A literary analog identifies a single main object, another object called the "analog" that is used to represent the main object in a literary fashion, and the intended imagery suggested by the analog.

The following frame is an instance of an analog for the main object eye and one of its analogs, the sun.

instance analog1 is a literary_analog
    object is eye
    analogs are sun
    images are {warmth. power trust}.

To the extent that sentence grammars capture the grammatical rules of a natural language, they are considered linguistic concepts. However, in the inventive system, these structures are augmented to contain elements that reflect the linkages between literary objectives and grammatical structure.

Literary augmented grammars (LAGs) are used in the inventive system to represent and use literary knowledge to produce compelling and interesting prose. Consider the following LAG for independent parallel description sentences:

INDPSD→SETTING verb (isa possessive_verb) FP (n=3)
    FP→'its' FEATURE FP 'its' FEATURE
    SETTING→noun_phrase (has_role setting)
    FEATURE→noun_phrase (isa iconic_feature_of SETTING)

Elements on the rightside of the LAG rules are annotated with expressions in parentheses. These expressions are called "literary constraints". It is through literary constraints 100A3 that linguistic and literary knowledge interact. While sentence grammars drive the construction of classes of grammatically correct sentences in a natural language, literary constraints in LAGs are designed to shape the contents of the sentence by using literary and domain knowledge to achieve various literary objectives.

Sentence generation procedures limit the instantiation of terminals to words or phrases that satisfy the literary constraint. The constraints describe the literary roles that the elements of the sentence must assume independently and/or with respect to one another. Constraint processing relies on how words (and their associated objects) are classified and linked in the literary knowledge-base. The constraints are used to search the literary and linguistic Knowledge Bases, where nouns, modifiers, verbs, etc. are categorized and associated with one another by a variety of classifications and associations. For example, brick, greens, and youth are nouns classified as iconic features of a university.

The constraint (isa possessive_verb)

in the preceding grammar constrains the preceding terminal, verb, to be instantiated from a certain class of verbs, namely, possessive verbs. Membership in this class is captured in the knowledge-base.

Similarly, (has_role setting) constrains the selection for the terminal noun_phrase in the SETTING rule of this grammar to be instantiated by a noun phase whose subject can function as a setting according to the classifications contained in the literary knowledge-base. The constraint isa feature_of SETTING is used to narrow the selections for a noun phrase based on its relationship with a choice for SETTING. In this case, the constraint ensures that the noun in the associated noun phrase is represented as an iconic feature of whatever object is selected in the noun_phrase for SETTING.

The constraint (n=3) in the first rule of this grammar instructs the sentence generation procedures to produce exactly three descriptive features in any generated sentence.

Regarding imagistic expertise, there have been four techniques identified for triggering images in the minds of the reader, including 1) Exotic or bizarre material; 2) Visual perception and P-consciousness-related verbs; 3) Familiar reference; and 4) Voyeurism.

The inventive system includes a framework in the literary KB for classifying linguistic elements to enable the automation of these techniques.

For example, to capture the bizarre, modifiers are linked with objects in frames named bizzaro_modifiers. Consider the following instance describing the bizzaro modifier bleeding.

instance bleeding is a bizzaro_modifier objects are (sun, plants, clothes, tombs, eyes}.

An action analogy LAG may be augmented with constraints to stimulate bizarre images in the mind of the reader. The following LAG for action analogies, BizarreActioniaalogy→NP VP like ANP NP→noun_phrase ANP→modifier (isa bizzaro_modifier) noun (isa analog of NP)

in conjunction with bizzaro_modifiers can be used to generate the following sentence.

Hart's eyes were like big bleeding suns.

The inventive system also triggers images with the technique of visual perception by constraining the principal verb in the appropriate LAG to be a member of a class of verbs called vp_verbs. These include verbs for seeing, looking, glancing, and so on.

Similarly, the inventive system narrates stories from a particular character's point of view using verbs selected from a special class of verbs represented in the literary KB called pc_verbs. These include verbs for feeling, thinking, understanding, wanting, etc. PC verbs give the reader the sense that the subject of these verbs has a psychological life.

A variation of the parallel setting description sentence is a sentence that describes a setting from a particular character's point of view. The following is the LAG for that sentence type, which includes a literary constraint that forces the vise of a PC verb to convey the character's consciousness:

POV→Agent (is a person) Verb (is a PC Verb) FirstFP

FirstFP→Setting FEATURE FP

FP→its FEATURE FP 1"."

FEATURE→noun_phrase (is a feature of SETTING)

SETTING→noun phrase (is a setting)

Stories that appeal to a reader's familiar experiences are known to quickly engage their audience. Triggering images of familiar things in the reader's mind keeps him or her interested and gives the author opportunity to manipulate the reader's expectation, better enabling the effect of plot twists and emotional turns. The inventive system can trigger images with familiar reference by classifying settings, objects and features as familiar to a class of readers and ensuring that they are used in stage and language generation through the elaboration of the thematic relation and the application of literary constraints.

In the exemplary story of betrayal, the university setting is a familiar reference to a wide class of readers and is expected to quickly form familiar and comforting images in the minds of these readers. These images are reinforced with the choice of particular modifiers and features. Of course, in the above examples, the imminent betrayal is quickly suggested, shifting the focus from the positive reference of the university to the universal image of classic betrayal.

Another literary "trick" known to trigger images and spark the reader's interest is voyeurism. Indeed, Franz Kafka, for example, often included in stories scenarios in which one person sneaks a peak at the behavior of others, or even places the reader in the position of outright voyeur.

For example, consider an elaboration of betrayal, voyeuristic betrayal. The inventive system may include a thematic relation for voyeuristic betrayal that requires a few new stage elements, including a new character, the voyeur, and a new action secretly_watch. The relation may compose a stage where the voyeur_is envious of the betrayer and engages in regular acts of secretly watching the betrayer's activities. The stage will initialize the story with the potential for an additional subplot involving the voyeur secretly witnessing the betrayer reveal his plans to betray the betrayed to some confidant. The Plot generation step will run the stage through a simulation, as described above, working out the details regarding the voyeur's experience and decision to tell what he witnessed to the betrayed. Regardless of how the plot develops, well-crafted sentences and word choices that describe scenes involving the secret witnessing of another's behavior will serve to stimulate the emotions and imaginations of human readers.

Returning now to the process level 100B of the invention (as shown in FIG. 2A and FIGS. 2B-2C for the generalized and specific embodiment of the invention), the process of thematic instantiation selects components from the domain knowledge-base sufficient to generate a story about a particular theme. The process of thematic instantiation uses a FLEX relation, based on a formal mathematization of a thematic concept like betrayal, and the goal-directed reasoning mechanism underlying Prolog, to search the domain knowledge-base 100A1 and assemble the story elements (characters, goals, events, settings, etc.) required to construct a story about the theme.

The following FLEX relation represents the components and their interrelationships sufficient to generate a story about the theme of betrayal.

relation betrayal_p (A_Betrayal)

if Evil is some goal whose plan is an EvilPlan and whose agent is a Betrayor and Saying is included in the EvilPlan and Saying is some say and Thwarting is included in the EvilPlan and Thwarting is some thwart and Betrayeds_Goal is the prevented_goal of Thwarting and Betrayers_Lie is the theme of the Saying
and Betrayers_Lie is some support of the Betrayeds_Goal
and Betrayed is some person
    whose goal is the Betrayeds_Goal
    and whose beliefs include the Betrayors_Lie.

A rough intuitive translation of how this particular relation is interpreted from a procedural perspective runs as follows.

First, look in the domain knowledge-base and find some goal with an associated plan and agent, where the plan includes a saying action and a thwarting action. This agent might be engaged in an act of betrayal; the agent might be the betrayer.

Then, look to find that the alleged betrayer's thwarting action is intended to thwart someone else's goal. The person who has this goal might be vulnerable to a betrayal. That person might be the betrayed.

Finally, look to find that the alleged betrayer's statement is in support of the betrayed's goal and that the alleged betrayed believes the statement.

The search of the domain KB 100A1 described here is performed automatically by the Prolog inference engine. If the search is successful, then the thematic instantiation process builds the stage. The stage, implemented by a FLEX frame, represents the key roles in a story about the designated theme.

In the inventive system, thematic instantiation 101 captures the essential characteristics of betrayal by building the following frame:
    frame betrayal is a concept
    default betrayer is a person and
    default betrayed is a person and
    default betrayers_goal is a goal and
    default betrayeds_goal is a goal and
    default betrayers_lie is a statement and
    default betrayal_location is a place and
    default betrayers_evil_action is a action.

While the domain elements of the story are selected as a result of thematic concept instantiation, the story generation process has yet to develop a specific plot. The domain concepts are static. They represent a snapshot in time, one capturing different characters and events that are the principal ingredients for a story. In plot generation, the ingredients are cooked; the details of plot are produced based on the behaviors of the characters.

In the inventive system, thematic instantiation 101 requires that the domain knowledge-base include many of the specific objects required to instantiate the theme.

Thereafter, the plot is developed through simulation. The process of plot generation 103 enables the inventive system to produce a variety of plots around a particular theme and a particular stage.

Through a forward reasoning process provided by FLEX, the inventive system can simulate character behavior. The principal knowledge used in plot generation is behavioral knowledge. As discussed earlier, characters have proactive behavior, represented by goals and plans, and reactive behavior represented by condition-action rules. These rules represent how characters react to particular states. Once set in motion, they result in actions that affect new states, and more rules fire; this process simulates a chain of reactive behavior. Eventually the process of forward-reasoning halts, indicating that a final state has been achieved and the simulation is over.

Changes made to behavioral knowledge lead the inventive system to produce different plots given the same theme and stage. In this way, the inventive system may be used to write different stories about the same theme with the same cast of characters, events, and initial states.

Plot generation 103 is very much a computational device for dynamically extending the domain knowledge-base through time. Initially, the domain KB contains basic story elements that may interact in a variety of ways. The use of rules and simulation enables the process of plot generation to play out a scenario by simulating the behaviors of the selected set of characters and recording the results of the simulation in terms of new events, states, and dialogue (i.e., the results of speaking actions) in the domain. KB. At the end of the simulation, the plot is developed and a particular outcome is realized. The new domain KB contains the completed plot or the scenario.

For example, suppose the process of thematic instantiation 101 has produced, from the domain KB, a stage 102 for the theme of betrayal, including the following elements (expressed informally for readability):
    betrayer: Professor Hart
    betrayed: Dave Striver
    location: University of Rome
    betrayed's goal: to get all members of thesis committee to approve and sign thesis
    betrayer's promise: to approve betrayed's thesis.

Plot generation will extend the story elements though time by executing actions associated with character goals, and will process behavioral rules, the final result being a detailed scenario. Specific actions that execute in the development of this stage include:
    sign
    refuse-to-sign
    say
    answer
    request_signatures
    demand Behavioral rules governing the typical behavior of committee members and the committee chairperson would execute during plot generation. For example, at the end of the thesis defense, the following rule would trigger the committee chairperson to request the members to sign the thesis.
    rule committee_chairs_behavior1
    if Committee is a thesis defense committee
    and chair is the chair of Committee
    and Defense is the subject of the Committee
    and the status of Defense includes completed
        and unjudged
    then do (request_signatures(Chair, Committee)).

The following rule would result in the typical committee member agreeing to sign the thesis when asked by the committee chair.
    rule committee_members_behavior
    IF
    Candidate is some person and
    Thesis is the thesis of Candidate and
    the committee of the Candidate includes Member and
    Request_To_Sign is some request and
    Member is the requestee of Request_To_Sign and
    the requester of Request_To_Sign is the chairman of the committee and
    Thesis is the document at subject of Request_To_Sign and
    status of Request_To_Sign is pending
    THEN
    do answer(Member, Request_To_Sign) and
    do sign(Member, Thesis)

The result of plot generation 103 produces a scenario 104 that would, for example, include the following series of actions and states (expressed informally for readability):

Prof Hart tells Dave Striver "I will support your defense and sign your thesis" at T0.
Dave Striver completed his thesis defense at time T1.
Prof Rodgers requests approval signatures of members of Dave Striver's committee at time T2.
All committee members except Prof Hart sign Dave Striver's thesis at time T3.
Prof Hart refuses to sign Dave Striver's thesis at time T4.
Prof Hart says "Dave does not deserve to graduate." at T5.
Prof Rodgers insists that Prof. Hart signs at T6.
Prof. Hart refuses to sign at T7.
Dave Striver's thesis is rejected All the actions that take place in this series are encoded in the domain KB and are related through the stage to the roles that participate in the theme of betrayal. This relationship allows the inventive system to infer, among other things, that Professor Hart's refusal to sign Striver's thesis is the specific act through which the betrayer successfully thwarted the goal of the betrayed (i.e., Striver's goal to graduate).

The inventive system must now compose the language to write the story based on the scenario and its relationship to the theme. Thus, writing the story includes proceeding to the outline and language generation As mentioned above, thematic instantiation and plot generation produces a stage and then a scenario respectively. The scenario will be input into the process of language generation. In this process, sentences are constructed based on the characters, goals, events, etc. present in the scenario. The sentence-types chosen and the sequence in which they appear depend on the story outline.

The process of story structure expansion builds a story outline 306, as described above and as shown in FIG. 3A. Story grammars, discussed above, are used to represent a variety of possible story structures. The process pursues a path through a grammar hierarchy, making either random or constrained choices as non-terminals in the grammars are expanded until a string of terminals, representing sentence types, is produced. The sequence of sentence types is the story outline 306 (e.g., see FIG. 3A).

The inventive system captures the knowledge used by story structure expansion and language generation in a three-level grammar hierarchy, as shown in FIG. 3C. This hierarchy is termed "the literary-to-linguistic grammar hierarchy" because of its successive levels takes story expansion from a high-level story structure (literary knowledge) down to an-English-sentence grammar and word selection (e.g., linguistic knowledge).

The top level of the hierarchy is composed of story grammars. Story grammars may be organized in a taxonomy, in which top-level story grammars are very generic and may apply to a wide variety of story types. Lower levels in the story grammar taxonomy may contain story grammars specialized for particular kinds of stories, like stories about betrayal, for example.

The terminals, or leaves of story grammars, are names of paragraph types. These are associated with structures in the second level of the grammar hierarchy called "paragraph grammars". The terminals of these grammars are in turn sentence-types.

The final level in the grammar hierarchy is composed of literary-augmented sentence grammars (LAGs), which are formal language grammars that represent components of English syntax augmented with literary constraints. The augmentation enables the generation of grammatically correct sentences that achieve particular literary objectives. The leaves of LAGs are variables instantiated to words that represent domain concepts, as described above.

Starting with a story grammar, the structures in the grammar hierarchy are expanded until a sequence of sentence-types is generated. This entire process may be performed independently of the scenario produced by thematic instantiation and plot generation. However, augmenting the story and paragraph grammars similarly to the way LAGs do for sentences allows for shaping the story outline by constraining choice points in its expansion based on literary objectives. These objectives may be determined by different elements of the theme or plot. More generally, the inventive system architecture suggests that any parameter (e.g., author styles or user preferences, etc.) may be used to constrain choices in the expansion of a story outline. Alternatively, the notion suggested by LAGs only to direct sentence generation.

Language generation takes the scenario and the story outline and uses literary and linguistic knowledge to generate a story in English. The language generation process is directed to "choosing words". The story outline is a map identifying the sequence of sentence types that will be used to tell the story. Each of these sentence types must be instantiated (e.g., subjects, objects, verbs, adjectives, etc. must be chosen from a lexicon). These choices are directed by the story elements represented in the scenario and the constraints imposed by literary objectives captured in the LAGs.

Consider the following fragment (simplified to enhance readability) from the inventive system's story grammar specialized for short stories about betrayal:

1. Story→Setting+Goals_and plans+Betrayers_evil_action+ betrayed's_state

2. Goals_and plans→Betrayed's_goal+Betrayers_promise+ Betrayers_goal

3. Setting→setting_description(betrayal_location,pov betrayed)

4. Betrayed's_goal→personal_goal_sentence (betrayed)

5. Betrayed's_goal→personal_goal_sentence (betrayer)

6. Betrayers_promise→promise_description(betrayer_betrayed)

7. Betrayers_evil_action→narrate_action(betrayers_evil_ action)

This grammar specifies a structure that first exposes the reader to a description of the setting where the betrayal occurs from the point of view of the betrayed.

It then describes the betrayed's goal and the betrayer's promise to assist the betrayed in achieving that goal.

Finally, the story ends with a description of the betrayer's evil action that ultimately thwarts the goal of the betrayed, and a statement about the betrayed's state. Non-terminals in this grammar begin with capital letter. Terminals begin with lowercase letters and indicate the names of paragraph grammars or LAGs. Arguments to grammars are roles contained in the stage-produced thematic instantiation and are assigned domain entities from the stage completed in plot generation.

The third rule in this story grammar leads to a paragraph grammar containing two sentences for describing a location from some character's point of view. Following from our sample stage, the paragraph grammar called in this third rule would be setting_description(university_of_rome,pov, 'Dave Striver').

The terminals in the following paragraph grammar lead to LAGs, with one for the parallel description sentence described above directed to the inventive system's knowledge level.

1. Setting_description(Loc,pov,Person)→pc_of (Person, Loc)+parallel_dscrp(Loc,pov,Person)

A brief sample story generated from the simple grammars just described and the theme and stage produced earlier in our example follows.

Dave loves the University of Rome. He loves its studious youth, ivy-covered clocktowers and its sturdy brick Dave wanted to graduate. Prof Hart told Dave, "I will sign your thesis at your defense." Prof Hart actually intends to thwart Dave's plans to graduate. After Dave completed his defense and the chairman of Dave's committee asked Prof Hart to sign Dave's thesis, Prof. Hart refused to sign. Dave was crushed.

The brief examples here taken from the inventive system's grammar hierarchy illustrate how story grammars can drive a variety of story structures that lead to paragraphs and sentence structures, which are in turn tied directly to domain entities and literary objectives through LAGs. Significant storytelling and literary variability can be achieved by altering, adding, or selecting different story, paragraph, or LAGs. Content variability can be achieved by creating or modifying thematic relations, behavioral rules, and domain knowledge.

As described above, the betrayal (theme) relation and frame, and the process by which the inventive system generates stories, starting with an interesting theme, are described. Variations can be realized by adjusting the thematic relation to describe different outcomes.

For example, while the betrayal relation previously described allows for success or failure of the betrayer's goal, a betrayal frame for generating specialized stories about betrayal where the betrayer necessarily succeeds can be built, as shown below. The thematic instantiation process would ensure that the stories generated will include only events such that the betrayer will succeed in thwarting the betrayed. The instantiation of this type of betrayal might entail associated variations in plot, story structure, and language.

A similar approach can be taken to produce a variety of specializations. For example, cases where the betrayer's goal is considered altruistic by a general audience but taken as an offense by the betrayed. This is a case that may apply to a parent betraying a child's trust to ultimately save the child from a tragic end (or similarly Brutus' murder of Julius Caesar could be viewed as an altruistic/patriotic act to save the Roman Empire). Many variations may be achieved by adding or relaxing constraints in the thematic relation.

relation successful(Betrayal)
if Betrayer is the betrayer of the Betrayal
and Betrayers_Evil_Goal is the goal of the Betrayer
and Condition1 is the success of Betrayor_Evil_Goal
and Condition1
and Betrayed is the betrayed or Betrayal
and G is the goal of the Betrayed
and Condition2 is the success of C
and not (Condition2)
and RName is the name of the Betrayed
and DName is the name of the Betrayor
and !.

Thus, as described above, the system of the present invention employs a plurality of processes in story generation. For example, the invention uses thematic instantiation, which is the process by which a theme produces a stage. A stage links a theme to a specific set of domain entities that are sufficient to realize the theme in some artifact in some language.

In the exemplary system developed for story generation, a theme is expressed as a logical formula (e.g., in first order logic translated into the processing language of choice such as Prolog in the case at hand). That is, "interestingness" is formalized. Variables in the above formula are instantiated with elements from the domain knowledge base. The result is a collection of key ingredients and their initial states called a "stage".

Additionally, the invention uses the process of Stage Evolution 102A (e.g., see FIG. 2B for the generalized view of the invention for generating an artifact). The process of stage evolution is used to achieve width variability and creative distance from an initial input. Stage evolution takes the static entities and their behaviors composing a stage and extends the entities' interaction through time producing new entities and events. Stage evolution may be implemented using simulation and planning techniques. In story generation, stage evolution may be specialized as plot development. The result of the process is a detailed plot or scenario.

Additionally, the invention uses structural expansion, which uses compositional knowledge and a sequence of compositional sentences. These sentences are independent of scenario and language. This enables the easy use and reuse of different story structures in combination with different themes, plots, literary devices or languages. They form a structural template that describes the surface structure of an artifact.

In story generation, for example, structural expansion produces a detailed story structure that describes which parts of a story will be told when. For example, the protagonist will be introduced, then the setting will be described, then the antagonist's physical appearance will be described, then . . . etc.

Additionally, the invention incorporates language generation, which is the process that uses the lexical knowledge to produce grammatically correct sentences in the language L.

Further, the invention employs impressionistic shaping 107 (e.g., see FIGS. 2B and 2C), which is the process of generating expressions in L or C to satisfy some set of impressionistic objectives described in impressionistic knowledge sources.

The present invention employs a man-machine interface such as a Graphical User Interface (GUI). The GUI can be a low-level which can monitor and display, for example, the next result of the system and which prompts the user by telling the user what the system is going to do and please confirm (e.g., "I am going to select John Doe for the betrayer. Does the user want to change this selection?"). Alternatively, the GUI could allow higher level control by asking: "Please select a theme", "please select a character", "please select a character's property (ies)", "please select how a level of psychological consciousness of the following characters", "please select a story grabber", etc.

The man-machine interface allows for control of the creative process. While changing the contents of the different knowledge sources will effect different artifacts, the system 100 of the present invention identifies specific interface points that give the human user an opportunity to interactively control and guide the creative agent's process and influence the resultant artifact. Thus, for example, such interface points may be in the process steps, in the databases, etc. such that the plot elements or stage elements etc. can be anchored. By the same token, if such elements are anchored or changed which diverge from the requirements of the system or the theme, then a different result may occur different from what the system would have allowed.

Basically, any choice made by the system (e.g., choosing an event, choosing a plot, choosing a sentence, choosing a story grammar, choosing a word, choosing a character, choosing a character's property, etc.) may be made by the user. The interface points are realized by variables (places where certain elements (examples enumerated above) are initially left unspecified and whose range of possible values become more and more limited as the story generation process progress and choices for these variables are made incrementally—either by the system's random processes or by user's choices).

Specifically, if the FLEX representation of the theme is taken as an example, the capital letters are variables. As the system makes choices based on random processes or user input these variables are assigned values from the knowledge-base. Once an assignment is made, the variable's value is fixed (for a single pass through the system) and the value will represent a fixed element of the story. Any time a variable is encountered the system can prompt the user to make a choices from a list of possible values derived from the appropriate database.

Thus, the invention maintains a creative distance between input and output. In contrast, in the conventional systems for example, a machine turning an English story into one in German is not creative. Likewise, if the machines was given a list of characters, settings, plot, etc., which had to be used or merely changed the characters etc. for one another, then the machine would not be creative if such lists had to be used and there was a direct mapping from input to output. Instead, "creativeness" is provided by the invention since a disjoint, randomness occurs in selecting and containing various characters, etc. from various databases, while keeping the theme anchored thereto.

Thus, to provide creativeness, the invention merely needs to be provided a theme (e.g., betrayal, romantic love, ambition, jealousy, hatred, defined therefor and then the system can provide the story including the characters etc. after the theme is input. The them is the core to the story generation system, and the system makes random choices as appropriate and constraint-based choices.

Thus, if a betrayal theme is selected, then the fact that betrayal was selected may in turn limit the system in terms of which specific characters (or plots, or settings, etc. having different characteristics) in, for example, a character database could be selected by a random generator to achieve variability and randomness. Thus, the system knows which characters are "good" for being a betrayer in a betrayal theme story.

Likewise, the system can select certain words, phrases, etc. based on the theme, as literary devices to evoke certain emotions from the reader. Again, with a betrayer theme, a betrayer must be selected having certain characteristics selfish, jealous, ambitious etc. to narrow down the choices of characters. However, if a character is randomly selected, then one may end up with a psychologically conscious" character (as opposed to one that is not) will constrain the words, phrases, adjectives, and adverbs used.

Hence, in the story of Julius Caesar's assassination, Brutus might be described with words, phrase, adjectives, adverbs, etc. such that the reader believes Brutus was "psychologically conscious" of what he was doing in killing Caesar. For example, Brutus might be described as "The inventive system thought . . . " as opposed to "Brutus mindlessly knifed Caesar . . . ". By the same token, the system also knows that other characters which are not to change or be constrained.

As shown in FIG. 4, a typical hardware configuration of an information handling/computer system 400 in accordance with the invention preferably has at least one processor or central processing unit (CPU) 411. The CPUs 411 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, microphone 432, and/or other user interface device to the bus 412), communication adapter 441 (for connecting an information handling system to a data processing network), and display adapter 436 (for connecting the bus 412 to a display device 438).

As shown in FIG. 5, in addition to the hardware and process environment described above, a different aspect of the invention includes a computer-implemented method for performing a document component importation and reconciliation, as described above. As an example, this method may be implemented in the particular hardware environment discussed above.

Such a method may be implemented, for example, by operating the CPU 411 (FIG. 4), to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 411 and hardware above, to perform a document component importation and reconciliation.

This signal-bearing media may include, for example, a RAM (not shown) contained within the CPU 411, as represented by the fast-access storage for example. Alternatively, the instructions may be contained in another signal-bearing media, such as a magnetic data storage diskette 500 (FIG. 5), directly or indirectly accessible by the CPU 411.

Whether contained in the diskette 500, the computer/CPU 411, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

While the invention has been described in terms of a preferred embodiment, those skilled in the art will recognize that the invention can be practiced with modification within the spirit and scope of the appended claims.

With the unique and unobvious features of the invention, the method and system of the present invention provide an architecture for computational creativity captures an explicit model of the creative process in terms of computational processes and formally encoded knowledge. It demonstrates how a formally represented theme can be used to seed and maintain interestingness as an artifact develops through different phases of the creative process.

It is noted that the present invention is not limited to story generation. For example, music generation would find great benefit from the present invention. Moreover, there are many other possible applications (including other artistic forms given the appropriate effectors and "lexicon" sculpture, painting, cooking etc.). The system and method of the present invention, specialized for story generation as described in above, produces a unique and more robust architecture than is present in the conventional system and methods. It is believed that this is also true for music as well as other languages of human expression.

The system architecture for computational creativity described above can revolutionize how computers and computation are applied to human endeavors. It is the foundation for engineering creative agents that generate interesting stories, scripts, adventure games, musical compositions, recipes, paintings, sculptures etc.

While the application of the inventive system and method to each of these areas requires engineering knowledge bases of considerable expertise, the present invention provides a demonstrable approach to building effective computational engines. These engines, termed the "creative agent", can pursue various humanistic themes, explore wide varieties of alternative scenarios and build expressions in humanistic languages while applying impressionistic knowledge to craft that language to best impact human audiences. Creative agents, as the functional core of many products in entertainment, education and business analysis, may have great benefit as creative tools.

Having thus described our invention, what we claim as new and desire to secure by Letters Patent is as follows:

1. A computer-implemented method of automatically generating a story, comprising:
   selecting a theme of said story;
   examining elements of said theme and instantiating said theme;
   using said theme to select and control other aspects of the story generation, including a plot of said story which employs knowledge-generated characteristics, relationships, and events;
   inputting said elements of said theme into a stage, said stage being a collection of elements of said story and their interrelationships; and
   inputting the stage into a simulation engine to play out a series of events over time, thereby to generate a plot, said plot including characters, their characteristics, and their respective interactions, and a history of events and their temporal relationships, said simulation engine including a predetermined randomness such that random elements from said databases are selected.

2. The method according to claim 1 further comprising:
   developing a scenario, including a plurality of activities, based on said plot generated, such that details of said activities are developed and bridged.

3. The method according to claim 2, wherein said scenarios are in a formal, logic based language independent of a spoken language, said method further comprising:
   inputting said scenarios into a natural language generator such that said scenarios are converted from said logic-based language to a natural language, said natural language being a spoken language understandable by a human reader, said conversion from said logic-based language to said natural language influencing at least one of story grammars, literary constraints, words, phrases, and sentence structure used in said scenario.

4. The method according to claim 3, further comprising:
   generating a story based on an input from said language generator.

5. The method according to claim 2, further comprising:
   generating a story based on an input from said language generator.

6. The method according to claim 5, further comprising:
   selecting a story structure while said story is being generated such that a sequence of said story is selectively changeable.

7. The method according to claim 6, further comprising:
   expanding said story according to said story structure selected.

8. The method according to claim 7, further comprising:
   generating a story outline based on said story expansion.

9. The method according to claim 1, further comprising:
   generating a story based on an input from a language generator.

10. The method according to claim 1, wherein a user selectively constrains said process at any of a plurality of predetermined steps of said process, such that said user may select a theme from a database of themes and a plot from a plot database, such that user can anchor the story to said choices made by the user.

11. The method according to claim 1, wherein said theme is selected from a plurality of themes stored in a database.

12. The method according to claim 1, wherein said theme is captured such that said theme influences other processes but are independent of said processes of the story generation.

13. The method according to claim 1, wherein said theme is captured and stored in a database in advance by forming a formal expression in a formal language using primitive elements provided in a thematic knowledge base.

14. The method according to claim 1, further comprising:
    identifying various classes of knowledge, a set of computational entities and their interactions for building creative agents for produce random, interesting artifacts in a particular language.

15. The method according to claim 1, further comprising:
    identifying various system components, their roles and interactions in an architecture for computational creativity.

16. The method according to claim 1, further comprising;
    identifying a notion of thematic knowledge and its role in an architecture for computational creativity.

17. The method according to claim 1, further comprising identifying a process of thematic instantiation and its role in an architecture for computational creativity.

18. The method according to claim 1, further comprising:
    identifying the role of class of knowledge in computational creativity called impressionistic knowledge.

19. The method according to claim 1, further comprising:
    identifying man machine interfaces points for controlling a creative process executed by said system.

20. The method according to claim 1, wherein said story generation is theme based such that said theme is selected first to constrain choices made in generating said story and to ensure that said story is about said theme.

21. The method according to claim 1, further comprising:
    using literary devices in generating said story so as to influence a literary style of said story.

22. The method according to claim 21, wherein said literary devices include a choice of words and phrase used in conveying events of said story to convey a psychological consciousness of a character of said story.

23. The method according to claim 21, wherein said literary devices are keyed to said theme.

24. The method according to claim 1, further comprising:
providing a user interface points at predetermined positions of a sequence of said story generation, such that said user selectively provides an input to constrain an aspect of said story generation.

25. A computer-implemented method of automatic story generation, comprising:
selecting a theme from a theme database;
using said theme to make further selection of elements of a stage of said story, such that said theme constrains choices for the function of the elements of said stage of said story;
inputting the stage elements into a simulator, said stage elements being appropriately represented for said simulator;
simulating, by said simulator, to generate a sequence of events of said story, each event of said sequence being performed by a selected character of said story, thereby to form a scenario of said story;
in parallel, selecting a story grammar for the story;
expanding said story to one of the paragraph level and the sentence level, depending upon the characteristics in said stage and the theme to influence the expansion of the story; and
linking the expansion of the story to the scenario and inputting each event into a natural language generator, to produce said story in a natural language.

26. The computer-implemented method according to claim 25, wherein said story grammar is linked to said theme.

27. The computer-implemented method according to claim 25, wherein said story grammar is selected by said user and randomly selected.

28. A system for generating a story, comprising:
means for selecting a theme of said story;
means for examining elements of said theme and instantiating said theme;
means for using said theme to select and control other aspects of the story generation, including a plot of said story which employs knowledge-generated characteristics, relationships, and events;
means for inputting said elements of said theme into a stage, said stage being a collection of elements of said story and their interrelationships; and
means for inputting the stage into a simulation engine to play out a series of events over time, thereby to generate a plot, said plot including characters, their characteristics, and their respective interactions, and a history of events and their temporal relationships, said simulation engine including a predetermined randomness such that random elements from said databases are selected.

29. A computer-implemented, theme-based method of creating a story, comprising:
automatically generating, by a computer, a story based on a theme,
wherein elements of the theme of the story are expounded upon in a simulation engine in the computer to further generate a plot of the story which employs knowledge-generated characteristics, relationships, and events;
said method further comprising:
selecting said theme of said story;
examining elements of said theme and instantiating said theme;
using said theme to select and control other aspects of the story generation, including said plot of said story which employs said knowledge-generated characteristics, said relationships, and said events;
inputting said elements of said theme into a stage, said stage being a collection of elements of said story and their interrelationships; and
inputting the stage into said simulation engine to play out a series of events over time, thereby to generate said plot, said plot including characters, their characteristics, and their respective interactions, and a history of events and their temporal relationships, said simulation engine including a predetermined randomness such that random elements from said databases are selected.

* * * * *